Figure 1:
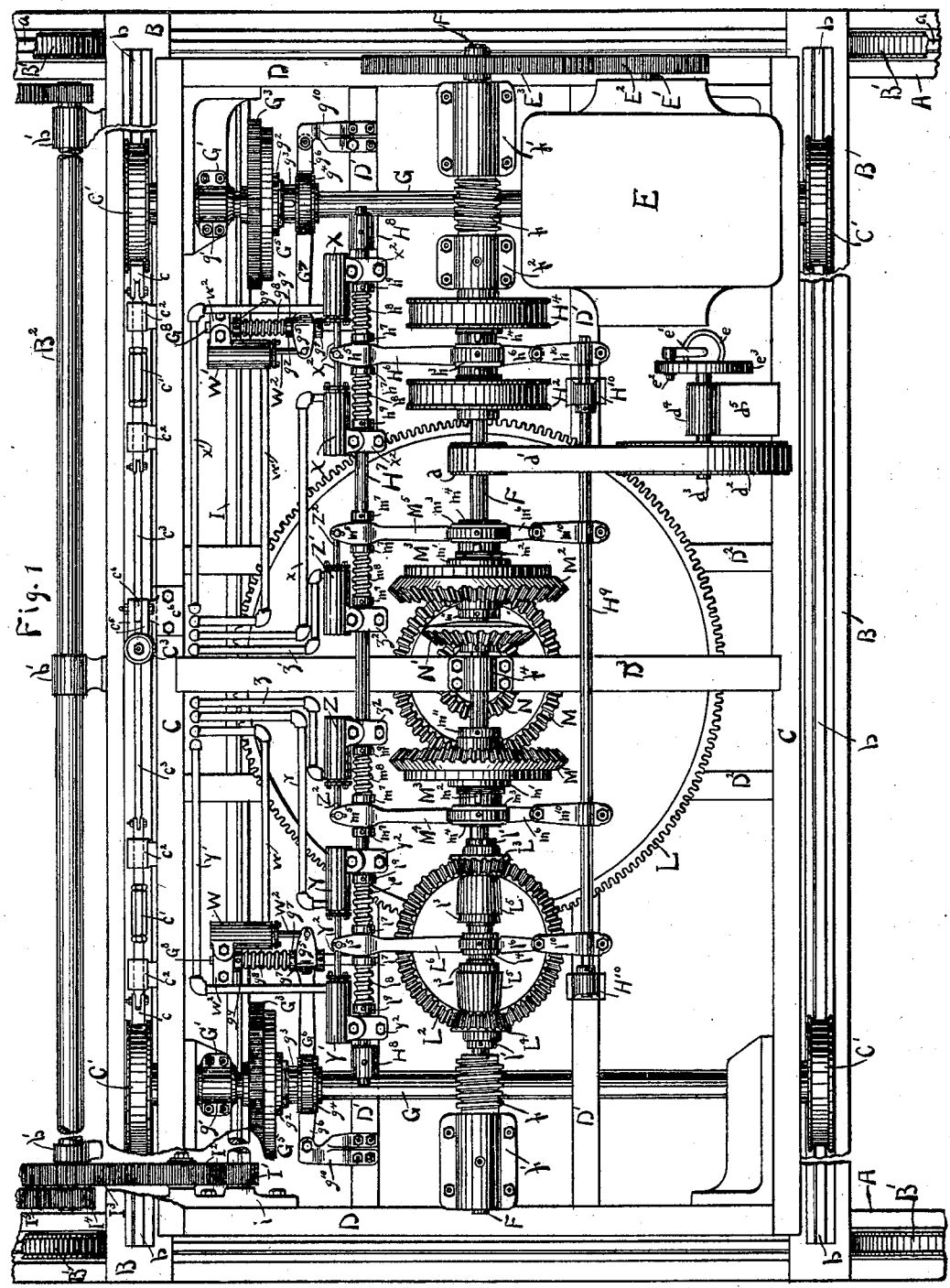

No. 681,575. Patented Aug. 27, 1901.
G. W. PACKER.
OVERHEAD TRAVELING CRANE.
(Application filed Aug. 2, 1900.)

(No Model.) 7 Sheets—Sheet 1.

Witnesses
Oscar W Bond
Belle W. Barry

Inventor
George W. Packer
By Banning & Banning
Attys

No. 681,575. Patented Aug. 27, 1901.
G. W. PACKER.
OVERHEAD TRAVELING CRANE.
(Application filed Aug. 2, 1900.)
(No Model.) 7 Sheets—Sheet 2.
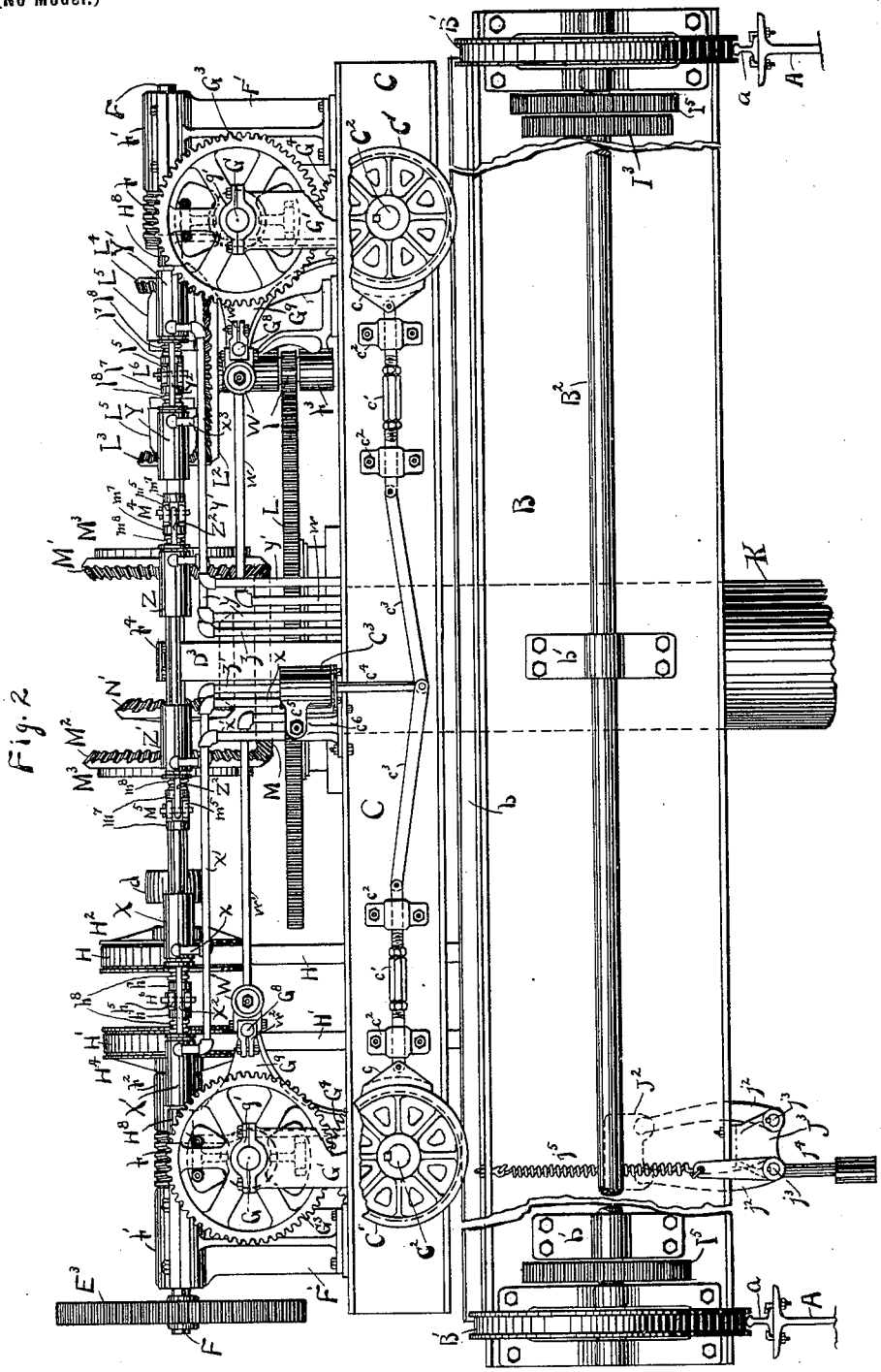
Witnesses
Inventor
George W. Packer.
By Banning & Banning
Attys.

No. 681,575. Patented Aug. 27, 1901.
G. W. PACKER.
OVERHEAD TRAVELING CRANE.
(Application filed Aug. 2, 1900.)
(No Model.) 7 Sheets—Sheet 3.
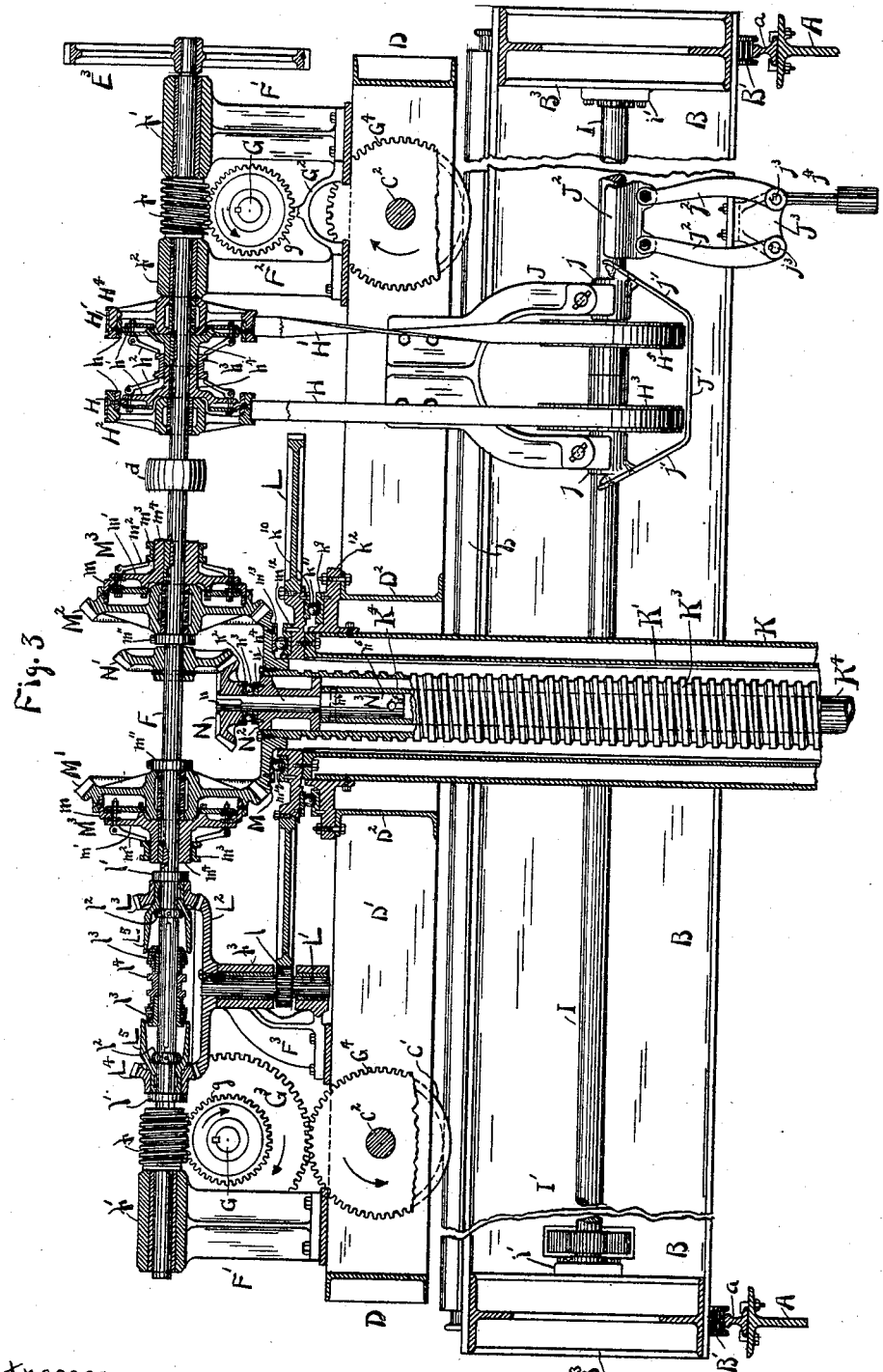
Witnesses
Inventor
George W. Packer
By Attys.

No. 681,575. Patented Aug. 27, 1901.
G. W. PACKER.
OVERHEAD TRAVELING CRANE.
(Application filed Aug. 2, 1900.)
(No Model.) 7 Sheets—Sheet 4.
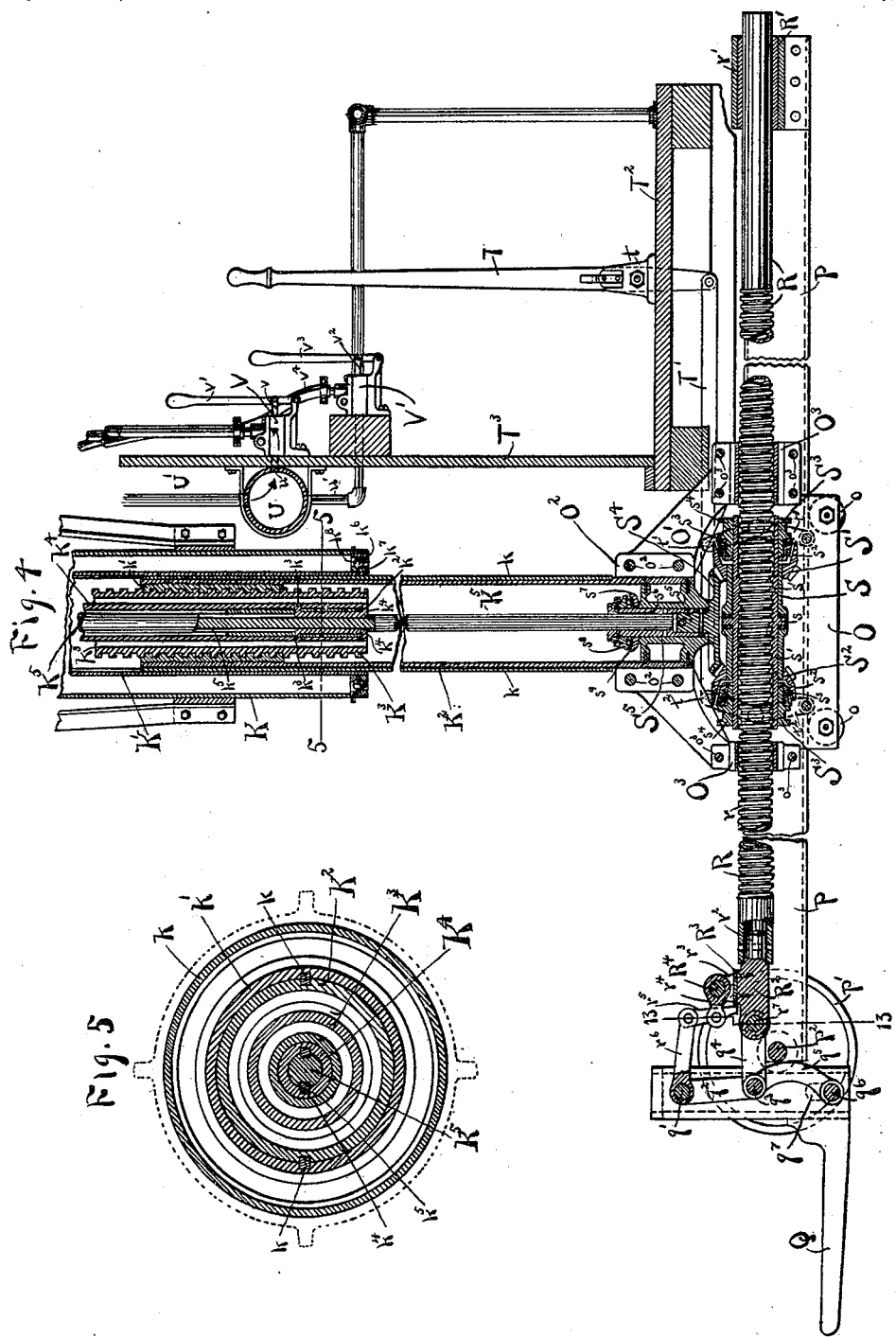
Witnesses
Oscar W. Bond
Belle W. Barry
Inventor
George W. Packer
By Banning & Banning
Att'ys No. 681,575. Patented Aug. 27, 1901.
G. W. PACKER.
OVERHEAD TRAVELING CRANE.
(Application filed Aug. 2, 1900.)
(No Model.) 7 Sheets—Sheet 5.
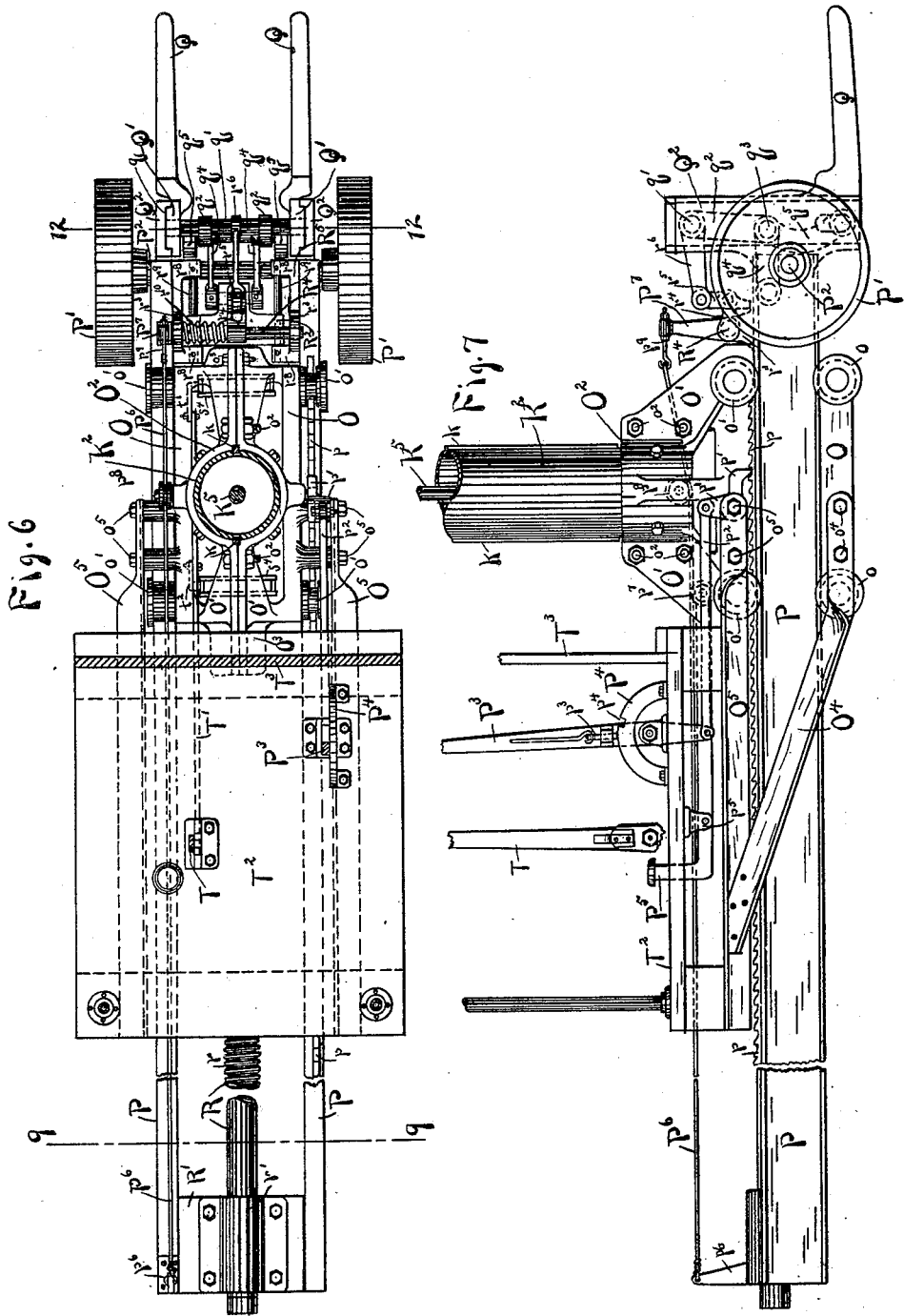
Witnesses
Inventor
George W. Packer,
By
Attys No. 681,575. Patented Aug. 27, 1901.
G. W. PACKER.
OVERHEAD TRAVELING CRANE.
(Application filed Aug. 2, 1900.)
(No Model.) 7 Sheets—Sheet 6.
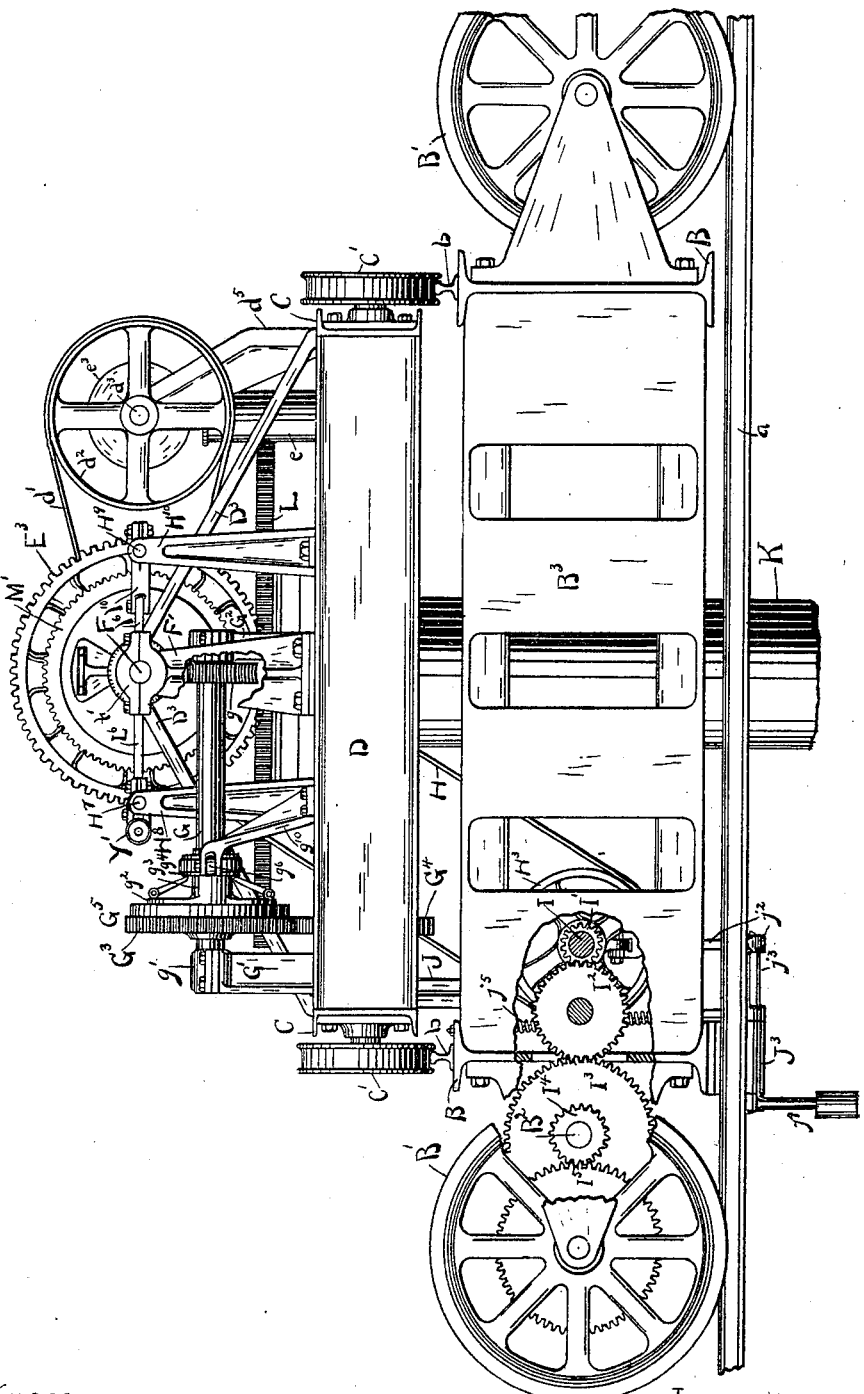

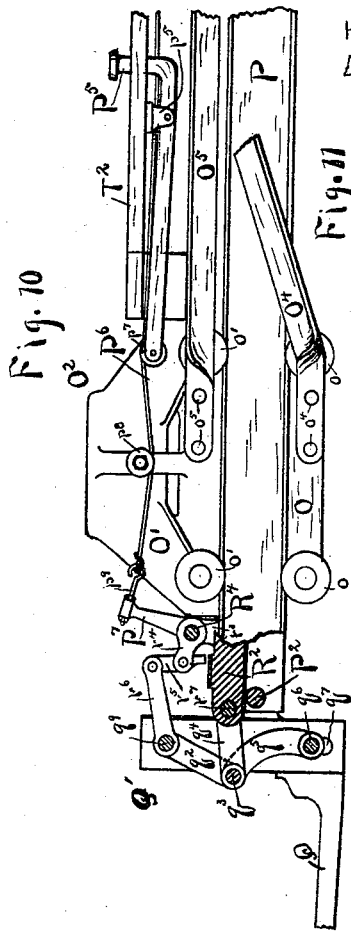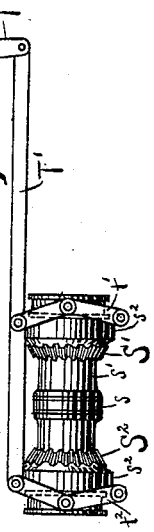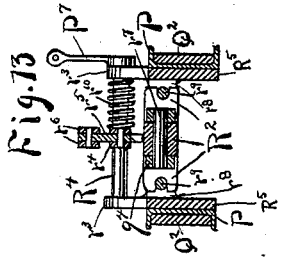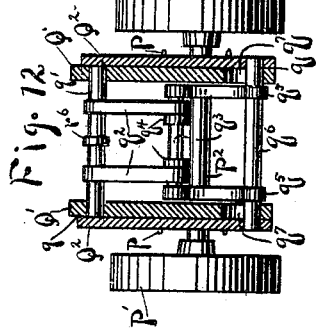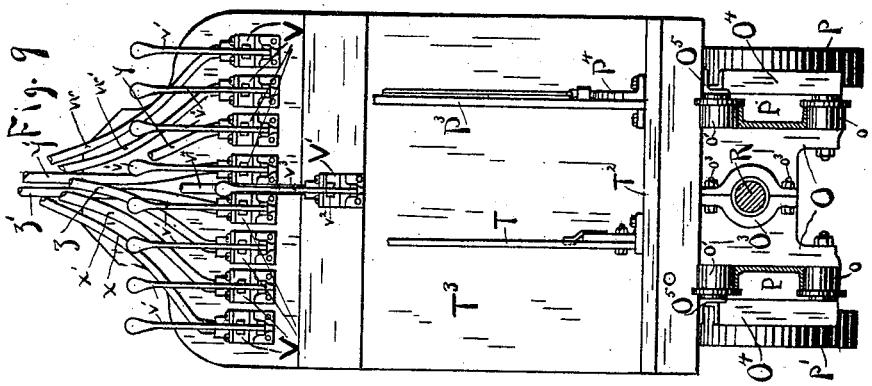

UNITED STATES PATENT OFFICE.

GEORGE W. PACKER, OF CHICAGO, ILLINOIS, ASSIGNOR TO THE DEERING HARVESTER COMPANY, OF SAME PLACE.

OVERHEAD TRAVELING CRANE.

SPECIFICATION forming part of Letters Patent No. 681,575, dated August 27, 1901.

Application filed August 2, 1900. Serial No. 25,638. (No model.)

*To all whom it may concern:*

Be it known that I, GEORGE W. PACKER, a citizen of the United States, residing at Chicago, Illinois, have invented certain new and useful Improvements in Overhead Traveling Cranes, of which the following is a specification.

This invention relates to overhead traveling cranes of that class employing a frame mounted on wheels and traveling on a track and carrying a carriage likewise mounted on wheels and traveling on a track on the frame and having supported from the carriage the arm or boom for lifting, carrying, delivering, and distributing various articles in different places and for different purposes.

The objects of the invention are to improve the construction and operation of the devices and appliances by which the crane is traveled as a whole and by which the arm or boom is raised and lowered and swung into different positions and reciprocated as required for use; to enable the power employed to be a single electric or other form of motor having the capacity or adaptability to furnish the power required for operating the crane as a whole and its different working parts; to utilize and obtain the benefits and advantages of fluid-pressure, preferably compressed air, in shifting the clutches for throwing into or out of use the several moving and working parts or appliances of the crane as a whole; to improve the suspending means and turning appliances for the arm or boom; to improve the construction and operation of the arm or boom, and to improve generally the construction and arrangement of the separate devices and appliances which enter into the construction and operation of the crane as a whole.

The invention consists in the features of construction and combination of parts hereinafter described, and pointed out in the claims as new.

In the drawings illustrating the invention, Figure 1 is a top or plan view with the supporting-beams of the main track broken away at each end and with the side beams or girders of the frame for the carriage broken out at each end. Fig. 2 is a side elevation of the parts shown in Fig. 1. Fig. 3 is a central longitudinal sectional elevation through the carriage with the raising and lowering screw-shaft for the arm or boom broken off at the end; Fig. 4, a central longitudinal sectional elevation of the lower end of the suspension-tube and the raising and lowering screw and of the arm or boom and its operating appliances with the arm or boom broken out at each end and showing also the platform on the arm or boom on which the operator stands and the levers for operating the fluid-pressure cylinders and other parts; Fig. 5, a transverse section on line 5 of Fig. 4 enlarged; Fig. 6, a top or plan view of the arm or boom and its operating devices or appliances, showing the suspending-tube in section and showing the arm or boom broken out at one end; Fig. 7, a side elevation of the parts shown in Fig. 6; Fig. 8, an end elevation of the traveling frame and an end elevation of the carriage or traveling support on the frame with some of the parts carried thereon omitted and with the suspending turn-table-cylinder shaft or tube broken off; Fig. 9, a cross-section on line 9 9 of Fig. 6, showing an elevation of the fluid-pressure-valve chambers, the pipes shut off, and the operating-levers; Fig. 10, a detail of the acting end of the arm or boom, showing the foot-lever, the cord, and the trip-arm for dropping the pick-up or lifter; Fig. 11, a detail of the lever-rod and the clutch-shifting arms for the clutches of the screw-threaded shaft of the arm or boom; Fig. 12, a cross-section on line 12 of Fig. 6, showing the support for the pick-up or lifter; and Fig. 13, a cross-section on line 13 13 of Fig. 4, showing the connection between the end of the arm or boom and the pick-up or lifter.

The crane as a whole is to have a travel back and forth on a suitable track, and, as shown, an I-beam A is suitably supported on each side of the runway for the crane, and on each I-beam is secured an ordinary T or other rail *a*, suitable for the wheels, by which the crane is traveled back and forth in the runway or other place of use. The frame for the carriage which travels on the main track may be formed of side beams or girders B, which may be of the I-beam variety or other suitable shape, and the side beams or girders are united at each end by an end beam or girder B³, and each end of the beam or girder B³ has suitably journaled thereon a carrying-wheel B', adapted to run on the main-track rails $a$ and travel the frame back and forth thereon. Each side beam or girder of the frame has secured thereto an ordinary T or other suitable rail $b$, the rail extending from end to end of the side beam or girder. One side beam B has mounted in suitable bearings $b'$ thereon a main driving shaft or axle B² for the carrying-wheels B', driven by a train of gear, as hereinafter described, from the power-motor and suitable driving-belts and other means.

The carriage to travel on the side beams of the frame and which supports and carries the arm or boom and the operating devices and appliances may be formed with side sills or beams C of the channel-iron type or other suitable form and with end sills or beams D of the same type as the side sills or beams, and for rigidity and strength the corners of the carriage-frame can be stiffened and strengthened by angle corner-pieces. As shown, the frame has longitudinal sills or bars D' and cross sills or bars D², which furnish a support for the operating parts, and extending from side beam to side beam is a raised support or arch D³ central of the carriage. The carriage is mounted on wheels C', running on the track-rails $b$ of the frame, a pair of wheels being provided at each end of the carriage, keyed or otherwise attached to the axles C², suitably journaled in the side beams of the carriage. The travel of the carriage is controlled by brake-shoes $c$ engaging wheels C' on one side of the carriage. Each brake-shoe is pivoted to a sliding rod $c'$, made in two parts, with a turnbuckle connection for adjusting purposes, and the parts of the rod are mounted in suitable bearings $c^2$ on the side beam. Each rod has pivoted to its inner end a link $c^3$, the two links coming together at their inner ends and having a pivotal connection to the pison-rod or stem $c^4$ of a piston which traverses a fluid-pressure or compressed-air cylinder C³, which cylinder is mounted by side ears or arms $c^5$ to an upright or standard $c^6$, attached to the top of the side beam. The admission of fluid-pressure or compressed air into the cylinder moves the piston thereof upward to force the stem $c^4$ upward, thereby raising the links and moving the sliding stems outward, applying the brake-shoes to the carrying-wheels to stop the movements of the carriage.

The power for traveling the crane forward and back on the main track and moving the carriage forward and back on the frame in the arrangement shown is furnished by an electric motor E, which is to receive the power in any suitable manner—as, for instance, from electric conductors through trolley poles and wheels or shoes—and the motor can be of the direct-current type or other suitable construction of motor. The shaft E' of the motor has on its end a gear E², which meshes with a gear E³ on the end of the main power-shaft for operating the various devices and appliances pertaining to the movements of the crane arm or boom. The main power-shaft F extends from end to end of the carriage, and at each end has thereon a worm-gear $f$, and the ends of the shaft are supported in suitable journal boxes or bearings $f'$ on standards or uprights F', mounted on cross-plates supported on the longitudinal sills or beams D' of the carriage or otherwise supported, and, as shown, adjacent to one of the worm-gears $f$ the shaft is supported in a suitable journal box or bearing $f^2$ on an upright or post F², mounted on and extending up from the longitudinal sills or beams D', and at the center of the shaft longitudinally is a suitable journal box or bearing $f^4$ on the arch or raised bar D³ at the center of the carriage. The shaft F has thereon a pulley $d$, over which and around a driving-wheel $d^2$ a belt $d'$ runs. The driving-wheel $d^2$ is on a shaft $d^3$, supported in a suitable journal box or bearing $d^4$ on a standard or support $d^5$, attached to one side beam or sill of the carriage-frame. An air-compressor pump $e$ is mounted on the carriage-frame and is operated from the driving-wheel $d^2$ and its shaft by an arm $e'$, reciprocated by the rotation of the shaft $d^3$ from a crank-wheel $e^3$ and its wrist-pin $e^2$, so as to compress air in the usual manner for use, as hereinafter described.

A cross-shaft G is located at each end of the carriage-frame, and each shaft is suitably mounted at its outer end in a journal box or bearing $g'$ on an upright or standard G', attached to the carriage-frame, and at its inner end each shaft is supported in the upper end of an upright or standard G² (see Figs. 3 and 8) on the carriage-frame. Each shaft G has a gear-wheel $g$ secured thereon to engage with the worm-gear $f$, so that the rotation of the main power-shaft F will rotate one or the other cross-shaft G and travel the carriage or support in one direction or the other, according to which spur-gear and worm-gear has its shaft engaged to do the driving. Each shaft G has thereon a gear G³, which meshes with a gear G⁴ on the axle of the carrying-wheels of the carriage, for which purpose a shaft is located in line with a cross-shaft or axle of the carriage having thereon the wheels. Each gear G³ has adjacent thereto and connected therewith a friction-clutch G⁵. The clutch G⁵ may be of any suitable construction. As shown, it is in the form of a rim $g^2$ on the gear, into which a cone or expanding rim $g^3$ extends, and the cone or rim is on a sleeve or hub $g^4$, splined on the shaft, so as to be free to move, as is common with clutches. Each sleeve or hub $g^4$ of the cone has flanges between which is located a lever having a stud or pivot connection with the sleeve or hub, one lever G⁶ operating the clutch of one gear and the other gear G³ having its clutch operated by a lever G⁷ of a similar construction to the lever G⁶, so that a description of one lever describes both levers. Each lever has at its outer end a fork $g^5$, which straddles or passes on each side of a rod or shaft $G^8$, supported from the carriage-frame in suitable standards or uprights $G^9$. The end $g^5$ of the lever is located between collars $g^7$ on said shaft $G^8$, one of which is movable on the shaft, and around the shaft between the movable collar $g^7$ and a collar $g^9$ is a coiled spring $g^8$, by means of which the lever is returned to and maintained in a normal position, with the parts of the clutch disengaged. The opposite end $g^6$ of each lever is pivoted to the end of a bracket or arm $g^{10}$, attached to a longitudinal sill or bar $D'$ of the carriage-frame in the arrangement shown, giving this end of the lever a fixed pivot and leaving the opposite end $g^5$ of the lever free to be moved and have such movement operate the clutch.

The pitches of the worm-gears are opposite, one having a right-hand pitch and the other a left hand, by which arrangement the travel of the carriage will be in one direction or the other, according to which clutch is engaged. The engagement of the clutch for the lever $G^6$ causes the worm-gear having the right-hand pitch to operate and travel the carriage in the opposite direction to the pitch of the worm, and with the clutch of the lever $G^7$ engaged the worm-gear with the left-hand pitch operates and travels the carriage in the opposite direction to the pitch of the worm, thus giving a reverse travel to the carriage from the operation of the two worms. It will thus be seen that by engaging the clutch of the proper lever the direction in which the carriage is to be traveled is controlled, as with such engagement the coöperating worm-gear of the engaged clutch acts and travels the carriage, thus enabling the carriage to be traveled back and forth on the frame as desired by engaging the clutch of one lever or the other to give opposite directions of travel. With the disengagement of both levers the carriage will remain stationary at any point of travel and can be stopped at the point desired by the application of the brake to the wheels, and when one clutch is engaged the other clutch is disengaged, preventing the worm for the disengaged clutch from imparting rotation to the axle driven from its shaft.

A straight belt H and a cross-belt $H'$ furnish the means for traveling the frame on the main track in opposite directions. The straight belt H runs over a pulley $H^2$ on the main power-shaft F and over a pulley $H^3$ on a counter-shaft I, supported in suitable bearings or boxes on a bracket or support $i$, attached to the end beams $B^3$ of the carrying-frame. The cross-belt $H'$ runs over a pulley $H^4$ on the main power-shaft F and over a pulley $H^5$ on the counter-shaft I, by which arrangement the counter-shaft will be driven in one direction or the other, according to which belt is doing the driving. Each pulley $H^2$ and $H^4$ is loosely mounted on the shaft and each has coöperating therewith a clutch, both clutches operated from a common lever $H^6$. Each clutch, as shown, is of the clamp band or jaw form, having a flange or rim $h$ on the pulley engaged by a clamp band or ring on a center or spider $h'$, forced into clamping the flange by the operation of contact levers or arms $h^2$, engaged by a sliding collar $h^3$, mounted on a hub $h^4$ of the center or spider, each hub being keyed or splined to the power-shaft. The common lever $H^6$ is pivotally connected with the sliding collar or sleeve $h^3$ by a suitable stud or pivot and has a forked end $h^5$ to straddle or pass on each side of a rod or shaft $H^7$, secured in posts or uprights $H^8$, mounted on a longitudinal sill or beam $D'$ of the carriage-frame. The forked end $h^5$ extends between two movable collars $h^7$ on the shaft, and between each collar $h^7$ and a collar $h^9$, fixed to the shaft, is a coiled spring $h^8$, by means of which the lever is held in normal position and returned to normal position after each movement, so that when in normal position the clutch of neither pulley is engaged and neither pulley will be revolved.

The movement of the lever to engage the clutch of the pulley $H^2$ will revolve that pulley from the power-shaft and drive the belt H and through the pulley $H^3$ revolve the counter-shaft I, and with the disengagement of the pulley $H^2$ from its clutch and the engagement of the pulley $H^4$ by its clutch through the movement of the lever $H^6$ the pulley $H^4$ will drive the belt $H'$, driving the pulley $H^5$ to revolve the counter-shaft I in the opposite direction from the revolving of such shaft by the pulley $H^2$. Either clutch, as required, is engaged with its pulley by moving the lever $H^6$, so as to move the collar $h^3$ and cause such collar to act on the levers or arms $h^2$ and force the levers or arms inward, engaging the clamp rim or band with the flange or rim $h$ of the pulley. The opposite end $h^6$ of each lever $H^6$ is pivoted to a bracket or support $h^{10}$, clamped on a shaft $H^9$, secured in suitable standards or uprights $H^{10}$ on a longitudinal sill or beam $D'$ of the carriage-frame and on the opposite side of the power-shaft to the shaft $H^7$, as shown in Fig. 1. The oppositely-rotating shaft I has at one end a gear $I'$, which meshes with a gear $I^2$ on a journal or spindle on the bracket or support $i$ on one end sill of the carriage-frame, and the gear $I^2$ meshes with a gear $I^3$ on the shaft or axle $B^2$ for rotating the shaft or axle in one direction or the other, according as to whether the straight belt or the cross-belt is doing the driving. The shaft or axle $B^2$ at each end has a gear $I^4$, which meshes with a gear $I^5$ on the spindle or axle of the traveling wheel at that end of the frame, so that the rotation of the shaft through the gears rotates the two wheels simultaneously and travels the carriage back and forth on the main track.

Secured to a longitudinal sill $D'$ of the carriage-frame is a hanger J, attached to collars $j$ on the shaft I, which collars have secured thereto a shoe J', having inclined ends $j'$ to contact a drop support or bearing $J^2$, pivotally attached to arms or links $j^2$, carried by shafts $j^3$ from a bracket or support $J^3$ on the main frame for the contact to move the support or bearing out of the way and permit the carriage to pass the support or bearing in its travel in either direction. One of the shafts $j^3$ has secured thereto a weighted arm $j^4$, returned to normal position by a spring $j^5$, thereby returning the drop support or bearing after it has been passed by the hanger. The collars $j$ are connected with the carriage or trolley through the suspending brackets J, and the pulleys $H^6$ $H^5$, which are keyed to the shaft I, are located between the collars $j$, and as the carriage or trolley travels back and forth the pulleys are moved accordingly on the shaft.

An outer supporting cylinder or tube K depends centrally from the carriage and is supported on the longitudinal sills D' and cross-sills $D^2$ by a head or plate $k^{12}$, bolted to the sills. This outer supporting cylinder or tube is fixed in position and has located within its interior a rotatable cylinder or tubular shaft K', suspended from the hub or center of the main driving-wheel. A second cylinder or tubular shaft $K^2$ slides in the cylinder or shaft K' and is connected therewith by a suitable spline $k$ on the sliding or extensible cylinder or shaft $K^2$, running in a groove of the fixed cylinder or shaft K', so that the cylinder or shaft $K^2$ can be projected and returned in a straight-line movement. The two cylinders or shafts K' and $K^2$ constitute an extensible turning or turn-table suspending cylinder or shaft for carrying the arm or boom. A hollow shaft $K^3$ extends inside of and downward through the fixed cylinder or shaft $K^2$, and this shaft $K^3$ has an exterior screw-thread, which engages with a nut $k'$, screw-threaded or otherwise entered in and secured to the end of the extensible section $K^2$ of the suspending cylinder or shaft, so that with the rotation of the hollow shaft $K^3$ the nut $k'$ will be advanced or receded thereon to project or return the movable section of the suspending cylinder or shaft. A sleeve or hollow rod $K^4$ extends through the hollow shaft $K^3$ and has sliding therein a rod or shaft $K^5$, the sleeve or hollow rod and the solid rod forming an extensible power rod or shaft for operating the gear for reciprocating the arm or boom. The lower end of the sleeve or rod $K^4$ has secured therein a bearing $k^2$, attached to a section $k^3$, and the bearing $k^2$ has a spline or key $k^4$, which enters a groove or slot $k^5$ in the extensible or sliding rod or shaft-section, locking the sliding rod or shaft and the fixed hollow rod or shaft together, so as to revolve in unison. The lower end of the fixed supporting outer cylinder or tube K has on its interior a band or ring $k^6$, and a band or ring $k^7$ is on the lower end of the cylinder or tube K', the two bands or rings each having a groove or recess forming a track or race for balls $k^8$, so as to furnish a ball-bearing between the two cylinders or tubes to reduce the friction and facilitate the turning of the cylinder or tube K' in the operation of the crane. The head or support $k^{12}$ has thereon a band or track $k^9$, having a groove in its upper face, and a band or track $k^{10}$, having a groove in its under face, is attached to the hub or center of the main gear for turning the suspending-tube, and between the two bands or tracks in the grooves are balls $k^{11}$, furnishing a ball-bearing for the main gear and the suspending turn-table cylinder or tube for lessening the friction and giving the cylinder or tube an easy bearing for turning.

The main turning or turn-table gear L, from the center or hub of which the turning or turn-table tube cylinder or shaft as a whole is suspended, has its gear in mesh with a pinion $l$ on a shaft L', supported in suitable journal boxes or bearings $f^3$ on an arm or support $F^3$, attached to one of the longitudinal sills D' of the carriage-frame. The shaft at its upper end has secured thereto a bevel-gear $L^2$, in mesh with which on opposite sides is a bevel-pinion $l^3$ and a bevel-pinion $l^4$, facing each other and both loosely mounted on the main power-shaft F. Each bevel-pinion is held against end movement in one direction by a collar $l'$, respectively, fixed on the shaft, and is locked in place against end movement in the opposite direction by a ring $l^2$ on the shaft, and between the two rings the hub or sleeve on which each gear is mounted is continued, so as to form the cup-section $L^5$ of a friction-clutch. Each cup-section has a friction-cone $l^3$ to coöperate therewith, and the cones are carried by a sliding sleeve $l^4$, splined to the power-shaft F, so that the sleeve can be moved and cause the friction-cones to engage with their respective clutch-cups. Pivotally connected with the sliding collar $l^4$ by a suitable stud or pivot is a lever $L^6$, one end of which has a fork $l^5$, which straddles or passes on each side of the fixed shaft or rod $H^7$. Each side of the forked end of the lever $L^6$ on the rod $H^7$ is a movable collar $l^7$, and between each movable collar and a fixed collar $l^9$ on the shaft $H^7$ is a coiled spring $l^8$, which operates to hold the lever $L^6$ in normal position with both clutches out of engagement and to permit the lever to be moved in either direction and after each movement have the spring on the side in the direction of movement act to return the lever and disengage the clutch, which has been brought into engagement by the movement of the lever. The opposite end $l^6$ of the lever is pivoted to a bracket or arm $l^{10}$, clamped onto the rod $H^9$, so as to permit the end $l^5$ of the lever to be moved as required to engage the bevel-pinion $L^3$ or the bevel-pinion $L^4$.

The pinions $L^3$ and $L^4$ are located on opposite sides of the bevel-gear $L^2$, and such gear will be given a rotation in one direction by the action of the pinion $L^3$ when in clutch with the power-shaft and will be rotated in the opposite direction by the action of the pinion $L^4$ when in clutch with the power-shaft, and either pinion can be brought into clutch with the power-shaft by moving the lever $L^6$ in the direction to engage the friction-clutch of the pinion $L^3$ or the friction-clutch of the pinion $L^4$, as required, for the direction of rotation of the suspending turning or turn-table cylinder or tubular shaft. The rotation of the bevel-gear $L^2$ rotates the shaft $L'$ and causes the pinion $l$, fixed thereto, to rotate the main gear L, and the rotation of the main gear will be governed by the rotation of the gear $L^2$ from the pinion $L^3$ or the pinion $L^4$, and with the rotation of the main gear L the inner cylinder or tube $K'$ will be rotated in one direction or the other, according to the rotation of the main gear, and such rotation of the cylinder or tube $K'$ also rotates the extensible cylinder or tube $K^2$ by the spline connection between the two cylinders or tubes. It will thus be seen that the suspending extensible turning or turn-table cylinder or tubular shaft as a whole can be rotated in one direction or be given a reverse direction of rotation by simply engaging one or the other of the pinions with the power-shaft.

The tubular screw-threaded shaft $K^3$ is attached at its upper end to the center or hub of a bevel-gear M, which gear is engaged with a bevel-gear $M'$ and a bevel-gear $M^2$, facing each other and located on opposite sides of the bevel-gear M and loosely mounted on the main power-shaft F. Each bevel-gear $M'$ and $M^2$ has a friction-clutch $M^3$ of a construction employing a rim or band $m$, attached to the gear, and having a flange located between a spider or center $m'$ and a movable clamping-jaw carried by the spider operated by arms or levers $m^2$, which arms or levers are engaged by a sliding collar or sleeve $m^3$, slidably mounted on the hub of the spider or center, which hub is splined to the power-shaft, and, as shown, the bevel-gear is held on one side against end movement on the shaft by the hub $m^4$ and on the opposite side by a collar, fixed to the power-shaft. A lever $M^4$, connected with the collar of the clutch for the bevel-gear $M'$ by a suitable stud or pivot, is provided to operate that clutch, and a lever $M^5$, connected with the collar or sleeve of the clutch for the bevel-gear $M^2$ by a suitable stud or pivot, is provided for operating that clutch. Each lever has a forked end $m^5$, which straddles or passes on opposite sides of the fixed shaft $H^7$, and the forked end of each lever is located between collars $m^7$, one of which is fixed to and the other is movable on the shaft $H^7$, and between the movable collar $m^7$ and a fixed collar $m^9$, around the shaft $H^7$, is a coiled spring $m^8$, which permits the movement of the lever in one direction and returns the lever to normal position and holds the lever in normal position with the clutch of the bevel-gear out of engagement, so that with the rotation of the power-shaft neither bevel-gear will operate and no rotation of the screw-threaded shaft will occur, maintaining the suspending cylinder or tube in whatever position the extensible section thereof may be adjusted. The other end $m^6$ of each lever $M^4$ and $M^5$ is pivotally attached to a bracket or support $m^{10}$, clamped onto the fixed shaft $H^9$, furnishing a pivotal fixed connection for the end of the lever, permitting the forked end to be moved. A band or track $m^{12}$, having a groove in its upper face, is attached to the center or hub of the main driving-wheel L, and a band or track $m^{13}$, having a groove in its under face, is attached to the hub or center of the bevel-gear M, and between the two bands or tracks in the grooves are located balls $m^{14}$, which furnish a ball-bearing for the bevel-gear to lessen the friction and give the screw-threaded shaft a free and easy revolution.

The upper end of the hollow shaft or rod $K^4$ has attached thereto a bevel-gear N, in mesh with which is a bevel-gear $N'$ on the main power-shaft F, so that the rotation of the power-shaft rotates the gears and gives rotation to the extensible power rod or shaft $K^4$ and $K^5$. The upper end of the shaft or rod $K^4$ abuts against a guide or head $N^2$, entered into the screw-threaded tube $K^3$, so as to have a bearing therein. A coupling stem or plug $N^3$ has one end $n^4$ extended through the guide or bearing-head and the other end $n^5$ extended into the end of the hollow shaft or rod $K^4$ and attached thereto by suitable pins or rivets $n^6$, and to the end $n^4$ is attached the bevel-gear N by a key $n$ to drive the power shaft or rod. The head of the bevel-gear N has secured to its hub end a band or track $n'$, having a groove in its face, and the guide or bearing head $N^2$ has secured to its end a band or track $n^2$, having a groove in its face, and between the two bands or tracks, in the grooves, are balls $n^3$, furnishing a ball-bearing for the bevel-gear, decreasing the friction and giving greater freedom and ease of rotation for driving the power rod or shaft $K^4$ and $K^5$.

It will be seen that by the bevel-gears M, $M'$, and $M^2$ the screw-threaded tubular shaft $K^3$ is given either right or left handed rotation, according as to which gear $M'$ and $M^2$ is clutched to the main power-shaft. This rotation of the tubular screw-threaded shaft through the nut $k'$, which is traveled up and down on and by the rotation of the shaft, causes the extensible section $K^2$ of the turn-table-suspending cylinder or tubular shaft to be projected or returned, according to the direction of rotation of the screw-threaded shaft, the rotation in one direction traveling the nut downward on the screw-threaded shaft and projecting or advancing the extensible section $K^2$ and the rotation in the opposite direction traveling the nut upward on the screw-threaded shaft, receding or returning the extensible section, so that this extensible section can be raised or lowered, as required, for the operation of horizontally raising and lowering the arm or boom which is carried thereby.

The bevel-gears N and N' are always in mesh and have the same direction of rotation, so that the rotation of the power rod or shaft $K^4$ and $K^5$ is at all times in the same direction. The rotation of the threaded tube and the rotation of the power rod or shaft in no way interferes one with the other, owing to the location and support of the power rod or shaft within the screw-threaded tubular shaft by the bearing guides or heads at each end of the hollow section of the power rod or shaft, within which the movable or sliding section is located, and the rotation of the hollow section $K^4$, which carries the movable or sliding section $K^5$, does not interfere with the extension or projection of the power rod or shaft coincident with the extension or projection of the extensible section $K^2$ of the suspending cylinder or tube. The movable or sliding section of the power rod or shaft is free to slide within the fixed hollow section through the key or spline connection between the sliding section $K^5$ of the rod and the fixed section $K^4$ thereof. It will thus be seen that the turn-table-suspending cylinder or tube has a telescopic action and that the power rod or shaft also has a telescopic action one in unison with the other and that both the turn-table-suspending cylinder or tube and the power rod or shaft are rotatable and the rotation of each is independent of the rotation of the other.

The extensible section of the turn-table-suspending cylinder or tube carries the frame which supports the arm or boom. This frame, as shown, is constructed with side rails or pieces O, and each side rail or piece at each end has an upwardly and inwardly inclined wall or flange O', united by a half-circle side band or rim $O^2$ for each section of the frame, and each end piece has a head or guide $O^3$, each with a semicircular hole or opening and forming a support or bearing. The side rails or pieces O each have journaled thereon on the outer face lower rollers $o$ and upper rollers $o'$, between which are located and travel the side beams or pieces P of the arm or boom. The two halves or sections of the carriage or support are bolted together by bolts $o^2$, passing through walls or flanges forming the end pieces or braces O', and by bolts $o^3$, passing through end flanges of the heads or guides $O^3$, which furnish the bearings or supports for the screw-threaded shaft which moves the arm or boom. The half bands or rims $O^2$ are bolted or otherwise secured to the lower end of the extensible section of the turn-table-suspending tube or hollow shaft, so as to carry and suspend the arm or boom and its supporting carriage or frame and operating parts from the turn-table-suspending tube or shaft.

As shown, the carriage or frame has a lower brace or support $O^4$ secured thereto at one end by bolts $o^4$ and has an upper brace or support $O^5$ secured thereto at one end by bolts $o^5$, the two braces or supports furnishing a support for the platform on which the operator stands, The side sills or rails P of the boom may be of channel-iron construction or other suitable formation, and the arm or boom is supported as a whole on the carriage or platform at the end of the turn-table-suspending tube or shaft by the side sills or rails located between the upper and lower carrying-rollers $o$ and $o'$ of the frame or carriage. At one end of the arm or boom are wheels P', mounted on the ends of a shaft or axle $P^2$, suitably journaled in the side sills or rails, so as to give the arm or boom when down or on the floor a rolling support at one end. One side sill or rail has on its upper edge a rack $p$, and the upper guide wheels or rollers $o'$ for the sill or rail on this side are grooved to permit of the passage of the rack. A dog or pawl $p'$, pivotally mounted on a stud or pin, which may be one of the bolts $o^5$, engages the rack $p$, and this dog or pawl has pivoted to its arm a link $p^2$, the other end of which is pivoted to the lower end of a lever $P^3$, carrying a dog $p^3$ to engage with a notch $p^4$ on a segment $P^4$, attached to the platform of the arm or boom, so that when the lever and segment are engaged the pawl or dog will be clear of the rack. A foot-lever $P^5$ is pivotally mounted between ears $p^5$ on the platform and at its free end carries a roller $p^7$, over which a cord $P^6$ passes. One end of the cord is attached to a post or standard $p^6$ at the end of the arm or boom, and the other end of the cord after passing under a roller $p^8$ on the frame or carriage of the arm or boom is attached to a pull stem or rod $p^9$ in the end of a lever $P^7$ for a purpose hereinafter described.

A pick-up lifter Q is carried at one end of the arm or boom. This pick-up or lifter is formed of two side fingers, each extending out from a head or slide Q', movable in a groove $q$ of a support or guide-head $Q^2$ at the end of each side sill or rail P of the arm or boom. The two heads or slides Q' are connected at the upper end by a cross-shaft $q'$, from which links $q^2$ are suspended, and carry a shaft $q^3$, which shaft is connected by links $q^4$ with a shaft $r^7$, mounted in the end of the head $R^2$ on the end of the screw-threaded shaft of the arm or boom. The cross-shaft $q^3$ has suspended therefrom curved links $q^5$, mounted at their lower ends on a cross-shaft $q^6$. The cross-shaft at each end projects through a slot $q^7$ in the adjacent slide Q', and each end enters and is secured in a head $Q^2$, as shown in Fig. 12.

The arm or boom is reciprocated by a shaft R, having a screw-thread $r$, the body of which passes through and is supported in the heads or guides $O^3$ of the frame or carriage of the turn-table-suspending tube or shaft. One end of the screw-threaded shaft is held or supported in a rim or band $r'$ on a cross-piece or support $R'$, attached to the side sills or rails of the arm or boom, so as to cause the shaft to move or slide as one with the side sills or rails. The unsupported end of the screw-threaded shaft has secured thereto a cross-head or cross-piece $R^2$, having a stem $r^2$ entering a hole in the end of the shaft and suitably secured therein. The cross-head or cross-piece has secured thereto a stop-plate $R^3$, and in upwardly-projecting ears $r^3$ thereof is mounted a shaft $R^4$, on which shaft is an arm $r^4$, having pivoted thereto a dog $r^5$ to engage the edge of the stop-plate, and the dog is pivoted to one end of a link $r^6$, the other end of which encircles the cross-shaft $q'$ of the heads or slides for the pick-up or lifter. A support $R^5$, attached to the side sill or rail of the arm or boom, is located on each side of the cross head or piece $R^2$, and each support has at each end an ear $r^8$, in which is secured a guide-rod $r^9$, on which the cross-head or cross-piece is free to slide to a limited extent. The supports $R^5$ have the upwardly-projected ears $r^3$, in which is mounted the shaft $R^4$, one ear $r^3$ on each support $R^5$, and one end of the shaft has secured thereto the arm $P^7$ of the cord $P^6$, so that by drawing on the cord the arm will be turned down to rock the shaft $R^4$ and move the arm $r^4$ to release the dog or catch $r^5$ from the stop-plate. The shaft $R^4$ is returned after being rocked in the construction shown by a coiled spring $r^{10}$, secured at one end to the shaft and at the other end to one of the ears $r^3$, so as to have the necessary action to return the shaft $R^4$ and the arm $P^7$ to normal position.

The pick-up or lifter has a limited vertical play in its supporting guides or heads and is suspended or carried by the links from the shaft $q^6$ and the shaft $r^7$, and when the latch or catch $r^5$ is engaged the pick-up or lifter is held in its raised position; but with the release of the latch or catch the pick-up or lifter can drop to the limit of the movement permitted by the cross-shaft $q^6$ and the slots $q^7$, allowing a descent sufficient to enter the pick-up or lifter beneath the article to be handled by the arm or boom. The release of the latch or catch $r^5$ can be held by the operator on the arm or boom platform placing his foot on the lever $P^5$ and pressing down, raising the roller $p^7$, producing a tension on the cord $P^6$ by the action of the rollers $p^7$ and $p^8$, which draw on the cord and depress the arm $P^7$, rocking the shaft $R^4$ and raising the arm $r^4$ and lifting the latch or catch $r^5$ from engagement, permitting the slides $Q'$ to descend, and in descending a straight-line movement is maintained by the links. The further advance of the arm or boom with the latch or catch disengaged moves the links $q^5$ and raises the pick-up or lifter, and when raised to normal position the latch or catch $r^5$ again engages with the stop-plate $R^3$ and holds the pick-up or lifter in its raised position. After the pick-up or lifter is under the article in position to be raised the dog $p'$ is engaged with the rack $p$ by moving the lever $P^3$ in the proper direction, giving the pick-up or lifter the resistance of the entire arm or boom in lifting the article, and the travel of the screw-threaded shaft is reversed by engaging the friction at the opposite end of the threaded sleeve or nut S for the reverse travel to act and raise or elevate the pick-up or lifter until the cross piece or head reaches the stop, at which point the article has been sufficiently lifted, and the catch $r^5$ engages the stop-block and holds the pick-up or lifter raised. The dog $p'$ is then released, and the continued rotation of the threaded nut or sleeve travels the arm or boom as required.

The shaft R is encircled by a threaded nut or sleeve S, on which is loosely mounted a bevel-gear $S'$ and a bevel-gear $S^2$, each gear having a head or sleeve $s'$, which abuts against a central flange $s$ on the nut, as shown in Fig. 4. Each bevel-gear $S'$ and $S^2$ has coacting therewith a friction-clutch $S^3$, which may be an ordinary friction-clutch of the cone type, each gear having the cup $s^2$ of the clutch thereon engaged by the cone $s^3$ on a sleeve or collar $s^4$, sliding on the end of the screw-threaded nut or sleeve. The two bevel-gears $S'$ and $S^2$ are both in mesh with a common bevel-gear $S^4$, attached to the end of the power-rod $K^4$ and $K^5$, for which purpose the rod and the gear are connected by a tube or bushing $S^6$, mounted in a guide head or bearing $S^5$, attached by screws or otherwise to the lower end of the extensible section of the suspending cylinder or tube $K^2$. The bevel-gear $S^4$ has a stem $s^5$ entered into the tube or bushing $s^6$ and secured therein by suitable pins or rivets, and the end of the power-rod likewise enters into the tube or bushing $s^6$ and is secured therein by suitable pins or rivets, so that the rotation of the shaft rotates the tube or bushing and with it the bevel-gear $S^4$, rotating either one or the other of the bevel-gears $S'$ or $S^2$, according to which clutch is engaged. The upper end of the guide sleeve or bearing $S^5$ has thereon a band or track $s^7$, having a groove in its upper face, and the tube or bushing $s^6$ has thereon a band or track $s^8$, having a groove in its under face, and between the two tracks, in the groove, balls $s^9$ are located, furnishing a ball-bearing between the power rod or shaft and the sleeve or tube, by which friction is decreased and the rotation of the parts made more easy and perfect.

The clutches $S^3$ are operated from a lever T, mounted in ears $t$ on the platform $T^2$, and the lever has pivotally connected therewith a link $T'$, which carries an arm $t'$, pivoted thereto and to the side rail or piece O and connected with the sleeve $s^4$ of one of the clutches by a suitable stud or pivot, and an arm $t^2$, also pivoted thereto and to the side rail or piece O and connected with the sleeve $s^4$ of the other clutch by a suitable stud or pivot, so that by moving the lever in one direction the clutch of the bevel-gear S' will be engaged and the clutch of the bevel-gear $S^2$ released, and by moving the lever in the opposite direction the clutch of the bevel-gear $S^2$ will be engaged and the clutch of the bevel-gear S' released. It will thus be seen that the operator by moving the lever T in the proper direction will engage the proper clutch with its gear, so that the revolving of the bevel-gear $S^4$ will rotate the engaged bevel-gear, and thereby rotate the nut, which acts on the screw-thread of the shaft R and moves the shaft and the arm or boom in one direction or the other, according to which bevel-gear S' or $S^2$ is in operation.

The platform $T^2$ is carried by the supports or braces $O^4$ and $O^5$, and on this platform the operator of the arm or boom stands to manipulate the clutch-lever T and the other appliances which are under his care. The platform has extending up therefrom a back board $T^3$, and this back board has attached thereto a reservoir U for fluid-pressure, preferably compressed air, receiving its supply by the pipe or tube U' from the air-compressor pump e or from a reservoir into which the air-compressor pump forces the air for storage, which reservoir can be carried on the under side of the carriage or frame or otherwise. The fluid-pressure or compressed-air reservoir U has communicating therewith through suitable ports or openings u a series of valve-chambers V, each valve-chamber having therein an induction and eduction valve operated by a stem v from a lever v' by the operator on the platform, and communicating with the fluid-pressure or compressed-air reservoir by a pipe u' is a valve-chamber V', having an induction and eduction valve therein, the stem $v^2$ of which is operated from a lever $v^3$ by the operator, and leading from the valve-chamber V' is an induction and eduction pipe or hose $v^4$, which connects with the fluid-pressure cylinder $C^3$ for moving the piston-rod of such cylinder and and applying the brakes, as already described, for which purpose the operator opens the valve by moving the lever $v^3$ to admit pressure through the pipe or hose $v^4$ to the fluid-pressure cylinder $C^3$ and move the piston-rod of such cylinder, and by the same lever moves the valve to close the induction and open the eduction to escape the air from the cylinder through the pipe or hose.

The levers $G^6$ and $G^7$ for operating the clutches $G^5$ for the gear-wheels $G^3$ each has its forked end $g^5$ connected with the piston-rod of a fluid-pressure cylinder, the end of the lever $G^6$ connecting with the piston-rod $W^2$ of a fluid-pressure cylinder W and the end of the lever $G^7$ connecting with the piston-rod $W^2$ of a fluid-pressure cylinder W'. The fluid-pressure cylinders are each mounted on a rod or shaft $G^8$ by a clamp $w^2$ in the arrangement shown, so as to have their piston-rods in line with the respective levers $G^6$ and $G^7$ for the movement of the piston-rod with the admission of fluid-pressure into the respective cylinders to move the levers and engage the friction-clutch with the gear. The cylinder W has compressed air supplied thereto and educted therefrom by a pipe or tube w, running from the cylinder to a valve-chamber V, and the cylinder W' has compressed air supplied thereto and educted therefrom by a pipe or tube w', running from the cylinder to a valve-chamber V. The movement of the lever v' of the valve in the chamber V for the pipe or tube w opens such valve and admits fluid-pressure into the pipe or tube, forcing the piston of the cylinder W inward, carrying with it the piston-rod $W^2$ and moving the lever $G^6$ in the direction to engage the parts of the friction-clutch of the gear for that lever, connecting the gear with the shaft G for the rotation of such shaft to revolve the gear and impart rotation to the axle $C^2$ through the gear $G^4$, moving the carriage in the direction of the rotation of the carrying-wheels C'. The release of the fluid-pressure by opening the valve, permitting the pressure to escape from the cylinder W through the pipe w, allows the spring $g^8$ to act and return the lever $G^6$ and the piston of the cylinder W to normal position, releasing the engagement of the clutch $G^5$ and stopping the revolving of the gear of that clutch from its shaft. The same operation occurs with the admission of fluid-pressure into the cylinder W' by opening the valve of its valve-chamber V for the fluid-pressure to pass through the pipe w' and operate the piston of the cylinder W', except that the lever $G^7$ is moved to engage its clutch $G^5$ with the gear of that clutch for the gear to be revolved with its shaft G and revolve the shaft $C^2$ at the opposite end of the carriage and in the opposite direction, giving the carriage an opposite direction of travel by the opposite travel of the carrying-wheels at that end of the carriage or support. The release of fluid-pressure from the cylinder W' by opening the valve of the tube or pipe w' allows the spring $g^8$ to act and return the lever and the piston of the cylinder W' to normal position, releasing the clutch of the lever $G^7$ and stopping the revolving of the gear of that clutch. It will thus be seen that the operator on the platform by moving the proper lever opens a valve to admit fluid-pressure to one or the other of the cylinders W or W' and operate one or the other of the levers $G^6$ and $G^7$, traveling the carriage forward and back on the frame.

The lever $H^6$ for operating the clutches of the pulleys $H^2$ and $H^4$ has its forked end $h^5$ connected with the common piston-rod $X^2$ of two fluid-pressure cylinders X and X' for the movement of the piston-rod to move the lever in one direction or the other. The cylinder X has fluid-pressure admitted thereinto back of its piston and educted therefrom by a tube or pipe x, connected with a valve-chamber V, and the cylinder X' has fluid-pressure admitted thereinto back of its piston and educted therefrom by a pipe or tube $x'$, leading to a valve-chamber V. The admission of fluid-pressure to the cylinder X by opening the valve of its valve-chamber for fluid-pressure to pass from the reservoir through the valve and the pipe or tube $x$ drives the piston in such cylinder for the piston-rod $X^2$ to move the end of the lever $H^6$ toward the cylinder X, and such movement of the piston-rod and lever engages the clutch of the pulley $H^4$ for such pulley to be revolved with the rotation of the main power-shaft F. The admission of fluid-pressure to the cylinder X' by opening the valve of its valve-chamber for fluid-pressure to pass from the reservoir through the valve and pipe or tube $x'$ drives the piston in the cylinder X' for the piston-rod $X^2$ to move the end of the lever $H^6$ in the direction of the cylinder X', engaging the clutch of the pulley $H^2$ for such pulley to be revolved from the main power-shaft F. The engagement of the pulley $H^2$ through the belt H drives the pulley $H^3$ and revolves the shaft I for such shaft through the train of gear operated therefrom to revolve the shaft or axle $B^2$ and cause such shaft or axle to revolve the carrying-wheels B' and move the crane as a whole on the main track in the direction corresponding to the direction of travel of the carrying-wheels. The engagement of the pulley $H^4$ with the main power-shaft drives the cross-belt H' for such belt to drive the pulley $H^5$ and rotate the shaft I, but in the opposite direction from its rotation by the straight belt, for such rotation of the shaft to reverse the revolution of the train of gear operated therefrom and give a reverse rotation to the shaft or axle $B^2$ and cause the wheels B' to revolve in the opposite direction and travel the crane as a whole in the opposite direction. The operator standing on the platform can by moving the lever of the proper valve throw into engagement the clutch of whichever pulley is required to travel the crane as a whole in the direction desired on the main track, as with the admission of fluid-pressure to one or the other of the cylinders X and X' the clutch-lever $H^6$ will be moved for engagement with the proper clutch.

The lever $L^6$ for operating the clutches of the bevel-pinions $L^3$ and $L^4$ has its forked end connected with a common piston-rod $Y^2$ of a fluid-pressure cylinder Y and a fluid-pressure cylinder Y', so that by the admission of fluid-pressure into one cylinder or the other the piston-rod will be moved, moving the lever $L^6$ to engage the clutch of the bevel-pinion $L^3$ or the clutch of the bevel-pinion $L^4$. Fluid-pressure is admitted into and educted from the cylinder Y by a tube or pipe $y$, leading to the cylinder from a valve-chamber V, and fluid-pressure is admitted into and educted from the cylinder Y' by a tube or pipe $y'$, leading to the cylinder from a valve-chamber V. The admission of fluid-pressure from the reservoir into the cylinder Y by opening the valve of its valve-chamber for the pressure to pass through the valve and the pipe or tube $y$ drives the piston of the cylinder and the piston-rod $Y^2$ for the rod to move the end of the lever $L^6$ in the direction of the cylinder Y, and the admission of fluid-pressure into the cylinder Y' from the reservoir by opening the valve of its valve-chamber for the pressure to pass through the valve and the pipe or tube $y'$ into the cylinder Y' drives the piston in such cylinder and the piston-rod $Y^2$ for the rod to move the end of the lever $L^6$ in the direction of the cylinder Y'. The movement of the end $l^5$ of the lever $L^6$ in the direction of the cylinder Y engages the clutch of the bevel-pinion $L^3$, connecting the pinion with the power-shaft F for the pinion to rotate with the shaft and revolve the bevel-gear $L^2$, which revolves the shaft L' and through the pinion $l$ revolves the main gear L in one direction, and with the revolving of the gear L the turntable-suspending cylinder or tube shaft and the arm or boom will be revolved, swinging the arm or boom in the direction of rotation. The movement of the end $l^5$ of the lever $L^6$ toward the cylinder Y' engages the clutch of the bevel-pinion $L^4$ for such pinion to revolve with the main power-shaft F and revolve the bevel-gear $L^2$, but in the opposite direction from the revolving of such gear by the pinion $L^3$, and the revolving of the gear $L^2$ rotates the shaft L' in the opposite direction and through the pinion $l$ oppositely revolves the main gear L for such gear to revolve the turntable-suspending cylinder or tube and the boom in the opposite direction from the revolving of the parts from the pinion $L^3$. It will thus be seen that the operator on the platform by opening the proper valve and admitting pressure to one or the other of the fluid-pressure cylinders Y or Y' can engage the required bevel-pinion with the bevel-gear $L^2$ to revolve that gear as required to turn or swing the arm or boom in the direction desired.

The levers $M^4$ and $M^5$ for operating the clutches $M^3$ of the bevel-gears M' and $M^2$ are moved from the fluid-pressure cylinders Z and Z', respectively, the lever $M^4$ having its forked end $m^5$ connected with the piston-rod $Z^2$ of the cylinder Z and the lever $M^5$ having its forked end $m^5$ connected with the piston-rod $Z^2$ of the cylinder Z'. Fluid-pressure is admitted into and discharged from the cylinder Z by a pipe or tube $z$ from a valve-chamber V, and fluid-pressure is admitted into and discharged from the cylinder Z' by a pipe or tube $z'$ from a valve-chamber. The admission of fluid-pressure into the cylinder Z by opening the valve of its valve-chamber for pressure to pass from the reservoir through the valve and the pipe $z$ into the cylinder drives the piston and its rod $Z^2$ to move the end of the lever $M^4$ in the direction of the cylinder to engage the clutch $M^3$ of the bevel-gear M', and the admission of fluid-pressure into the cylinder Z' by opening the valve of its valve-chamber for pressure to pass from the reservoir through the valve and the pipe $z'$ drives the piston in the cylinder and its rod $Z^2$ to move the end of the lever $M^5$ in the direction of the cylinder and engage the clutch $M^3$ of the bevel-gear $M^2$. The engagement of the clutch of the bevel-gear $M'$ connects the gear with the power-shaft F to be revolved with the shaft and revolve the bevel-gear M, which operates the screw-threaded shaft $K^3$ in one direction for the revolving of such shaft to travel the nut $k'$ thereon and move the extensible section of the turn-table-suspending cylinder or tube shaft. The engagement of the clutch of the bevel-gear $M^2$ connects the gear with the power-shaft F to revolve therewith and have the gear revolve the bevel-gear M in the opposite direction to that of its revolution from the gear $M'$ and have such revolving operate the screw-threaded shaft $K^3$ in the opposite direction and travel the nut $k'$ oppositely, giving a reverse movement to the extensible section of the turn-table-suspending cylinder or tube shaft. The operator by opening the proper valve and admitting fluid-pressure to one or the other of the cylinders Z and Z' operates one or the other of the levers $M^4$ or $M^5$ to engage either the clutch of the gear $M'$ or the clutch of the gear $M^2$ for the engaged gear to revolve the gear M and therefrom revolve the screw-threaded shaft $K^3$ and travel the nut in the proper direction as required to raise and lower the extensible section of the turn-table cylinder or tube shaft and raise and lower the arm or boom in horizontal planes.

It will be understood that the operator on the arm or boom platform by opening the proper valve admits fluid-pressure to whichever cylinder desired and by moving the valve in the opposite direction opens the valve for the escape of fluid-pressure from the cylinder. By this means the control of the movements of the crane as a whole is under the operator on the platform. The use of compressed air preferably as the fluid-pressure, owing to the rapidity and facility with which it can be handled, gives a perfect control of the various movements through operating the several clutch-levers by admitting compressed air into and discharging the air from whichever cylinder is required for the movement desired.

The rod or shaft $H^7$ furnishes a guide for giving a straight-line throw to the various clutch-levers $H^6$, $L^6$, $M^4$, and $M^5$ by reason of the forked ends of these several levers straddling or passing on each side of the rod or shaft. The rod or shaft also furnishes a support on which to mount the several compressed-air or fluid-pressure cylinders X and X', Y and Y', and Z and Z', and to mount the cylinders on the shaft each cylinder X and X' is provided with a clamp $x^2$ for securing the cylinders in position. The cylinders Y and Y' are each provided with a clamp $y^2$ for securing the cylinders in position, and the cylinders Z and Z' are each provided with a clamp $z^2$ for securing the cylinders in position. The clamps encompass and are movable on the supporting rod or shaft $H^7$ and enable the cylinders to be adjusted properly in relation to the several levers which they operate to give the required throw to each lever for moving the several clutches into and out of engagement to give the required reverse rotation to the various parts from the power-shaft, which has a continuous rotation in the same direction.

The power for operating the crane as a whole and its several parts is mounted and carried on the carriage or traveling support from which the arm or boom is suspended. The main power-shaft is mounted on the carriage or traveling support and is driven from the power-motor continuously in one direction. The frame is traveled on the main track from the rotation of the main power-shaft through the medium of clutch-actuated pulleys, the clutches of which are operated by fluid-pressure cylinders carried on the carriage or traveling support and having a common piston-rod which moves a lever common to both clutches. The carriage is traveled back and forth on the frame from the rotation of the main power-shaft by oppositely-pitched worm-gears and a clutch-actuated gear on a shaft at each end of the carriage, with the clutch of each gear operated from fluid-pressure cylinders, one for each gear, and carried on the carriage or traveling support, each cylinder having a piston-rod which moves a lever to engage and disengage the gear-clutch. The turn-table cylinder or tube-shaft is revolved in either direction by a gear having opposite directions of rotation from the main power-shaft through the medium of loose pinions on the power-shaft, each pinion having a clutch, and both clutches are operated by a common lever from fluid-pressure cylinders carried on the carriage or traveling support and having a common piston-rod which acts to move the lever and throw the clutches into and out of engagement with the pinions. The extensible turn-table or turning cylinder or tube shaft from which the arm or boom is suspended is advanced and receded through the action of a hollow shaft having a screw-thread on its exterior, which shaft has opposite directions of rotation given thereto from the main power-shaft through bevel-gears loosely mounted on the power-shaft, each of which has a clutch operated by a lever from a fluid-pressure cylinder for each lever carried on the carriage or traveling support and each having a piston-rod, by means of which the lever for each clutch is moved to throw the clutch into and out of engagement. The several operating-levers and the fluid-pressure cylinders are all carried on the carriage or movable support, and an air-compressing pump is also carried on the carriage or traveling support and operated from the main power-shaft, producing compressed air for the fluid-pressure to operate in the fluid-pressure cylinders. The compressed air is stored in a receptacle or reservoir which has connected therewith a series of valve-chambers, each having an induction and eduction valve, one valve-chamber and valve for each fluid-pressure cylinder, and each valve-chamber is connected with its fluid-pressure cylinder by an induction and eduction pipe. The support for the arm or boom has thereon a platform for an operator, who can manipulate a valve in a valve-chamber as required to produce an operation of a cylinder to give a required movement from the main power-shaft. A lever is provided by which the operator can travel the arm or boom horizontally, and such travel of the boom is had from the main power-shaft through intermeshing gears and a slidable or extensible power-rod having a gear at its lower end which meshes with clutch-actuated gears loosely mounted on a threaded sleeve or nut which engages with a threaded shaft, giving such shaft reverse movements, according to the engagement of one or the other of the bevel-gears, which engagement is made by the operator on the platform from a clutch-lever, and the boom at its acting end carries a pick-up or lifter which has a slight drop movement for insertion beneath the article to be raised or carried and delivered or deposited by the arm or boom, and the dropping of the pick-up or lifter is had through a foot-lever moved by the operator on the platform. It will thus be seen that the operator on the platform carried by the support or head on which the arm or boom is mounted controls the entire movements of the arm or boom; that the several movements of the crane as a whole and of the various parts which go to make up the crane are produced by the employment of fluid-pressure cylinders, preferably using compressed air as the motive force, and that the necessary changing or shifting of the power from the main power-shaft to operate whichever part is necessary for the required movement of the boom is made very expeditiously and in a positive manner through the application of fluid-pressure, making the operation of the crane as a whole perfect and reliable in every particular.

The crane as a whole can be traveled in either direction from one end to the other of the runway or place used and can also be traveled in either direction from one side to the other of the runway or place used. The arm or boom stands horizontal and is suspended by a turn-table extensible cylinder or tubular shaft, so that it can be turned or swung around in whatever position required for use and can be lowered to receive the article to be handled and after receiving the article can be raised to carry the article to the place to be deposited, and these movements are controlled by and through the application of fluid-pressure, preferably compressed air. The turning and swinging movement enables the arm or boom to be operated head on to receive or pick up an article, and the raising and lowering movement enables the arm or boom to be operated at any point desired within the limit of its ascent and descent. The arm or boom has a horizontal reciprocating movement which enables it to be advanced and receded in horizontal planes for use, and in its reciprocating movement it can be headed as required by turn-table suspension. These movements give the arm or boom perfect freedom of operation in every direction—vertical, horizontal, and in a circle.

While I have described the construction and operation of my improved overhead traveling crane with considerable minuteness and details of construction, I do not mean thereby to confine myself to forms, details, or operations further than as I may specify or call for them in the several claims, as I contemplate the use of equivalent devices and the making of mechanical changes as circumstances may render advisable or expedient without departing from the prominent features of my invention.

I claim—

1. In an overhead traveling crane, the combination of a frame mounted on wheels to travel on a track and having a track thereon, a carriage or traveling support movable on the track of the frame and having an arm or boom suspended therefrom, a motor on the carriage, a power-shaft on the carriage driven from the motor, clutch-actuated pulleys on the power-shaft, an axle or shaft for one pair of the frame-carrying wheels driven from the clutch-actuated pulleys, and fluid-pressure cylinders for engaging and disengaging the clutches of the clutch-actuated pulleys, substantially as described.

2. In an overhead traveling crane, the combination of a frame mounted on wheels to travel on a main track and having a track thereon, a carriage or traveling support movable on the track of the frame and having an arm or boom suspended therefrom, a motor on the carriage, a power-shaft on the carriage driven from the motor, clutch-actuated pulleys on the power-shaft, a counter-shaft on the frame driven from the clutch-actuated pulleys, an axle or shaft on the frame for one pair of the frame-carrying wheels driven from the counter-shaft, and fluid-pressure cylinders for engaging and disengaging the clutches of the clutch-actuated pulleys, substantially as described.

3. In an overhead traveling crane, the combination of a frame mounted on wheels to travel on the main track and having a track thereon, a carriage or traveling support movable on the track of the frame and having an arm or boom suspended therefrom, a motor on the carriage, a power-shaft on the carriage driven from the motor continuously in the same direction, a straight belt and a crossed belt, clutch-actuated pulleys on the power-shaft one for the straight and one for the crossed belt, a counter-shaft driven in opposite directions by the belts, a train of gear operated from the counter-shaft, an axle or shaft for one pair of the frame-carrying wheels driven from the train of gear, and fluid-pressure cylinders for engaging and disengaging the clutches of the clutch-actuated pulleys, substantially as described.

4. In an overhead traveling crane, the combination of a main track, a frame mounted on wheels to travel on the main track and having a track thereon, a carriage or traveling support movable on the track of the frame and having an arm or boom suspended therefrom, a motor on the carriage, a power-shaft on the carriage driven from the motor continuously in one direction, a straight belt and a crossed belt, two clutch-actuated pulleys on the power-shaft, one for the straight and one for the crossed belt, a counter-shaft, two pulleys on the counter-shaft, one for the straight and one for the crossed belt, for driving the counter-shaft in opposite directions, a train of gear operated from the counter-shaft, an axle or shaft for one pair of the frame-carrying wheels driven from the train of gear, and fluid-pressure cylinders for engaging and disengaging the clutches of the clutch-actuated pulleys, substantially as described.

5. In an overhead traveling crane, the combination of a power-shaft driven continuously in one direction, two clutch-actuated pulleys on the power-shaft, a lever common to the clutch of both pulleys, a fixed rod or shaft having movable collars thereon engaging the lever, a coiled resistance-spring on the rod or shaft for each movable collar, and fluid-pressure cylinders having a common piston-rod for moving the lever in opposite directions to engage the clutches of the clutch-actuated pulleys and have the springs operate to return the lever and disengage the clutches, substantially as described.

6. In an overhead traveling crane, the combination of a power-shaft driven continuously in one direction, a straight belt and a crossed belt, two clutch-actuated pulleys on the power-shaft one for the straight and one for the crossed belt, a lever common to the clutch of both pulleys, fluid-pressure cylinders for moving the lever in opposite directions to engage and disengage the clutches of the clutch-actuated pulleys and drive either belt, a counter-shaft driven in opposite directions by the belts, and means for transmitting power from the counter-shaft to travel the crane as a whole in either direction, substantially as described.

7. In an overhead traveling crane, the combination of a power-shaft driven continuously in one direction, two clutch-actuated pulleys on the power-shaft, a lever common to the clutch of both pulleys, fluid-pressure cylinders for moving the lever in opposite directions to engage and disengage the clutches of the pulleys, a fluid-pressure induction and eduction pipe for each cylinder, and a valve-chamber for admitting pressure into and discharging pressure from each pipe, substantially as described.

8. In an overhead traveling crane, the combination of a carriage or traveling support having the arm or boom suspended therefrom, a motor on the carriage or support, a power-shaft on the carriage driven from the motor continuously in one direction, oppositely-pitched worm-gears on the power-shaft, a cross-shaft at each end of the carriage driven in opposite directions from the oppositely-pitched worm-gears, an axle at each end of the carriage having traveling wheels on each axle for moving the carriage, a gear connection between the cross-shaft and the axle at each end of the carriage, a clutch for each cross-shaft gear, and a fluid-pressure cylinder, for operating each clutch to engage and disengage the clutch and travel the carriage in opposite directions, substantially as described.

9. In an overhead traveling crane, the combination of a movable carriage or traveling support having an arm or boom suspended therefrom, a power-shaft on the carriage driven continuously in one direction and having thereon oppositely-pitched worm-gears, a clutch operating the gear-shaft at each end of the carriage driven in opposite directions by the worm-gears driving the axle of the carriage in opposite directions, a lever for each clutch-gear and a fluid-pressure cylinder for each lever, engaging and disengaging the clutch of its gear to move the carriage in opposite directions, substantially as described.

10. In an overhead traveling crane, the combination of a movable carriage or traveling support having an arm or boom suspended threfrom, a power-shaft on the carriage driven continuously in one direction, oppositely-pitched worm-gears on the power-shaft, a clutch-actuated gear-shaft at each end of the carriage driven from the worm-gear at its end of the carriage, an axle at each end of the carriage driven from the clutch-actuated gear-shaft, a lever for the clutch of each clutch-gear, a fixed rod or shaft having thereon a movable collar engaging the lever, a spring on the rod or shaft engaging the movable collar, and a fluid-pressure cylinder for each lever operating to move the lever and engage and disengage the clutch and have the spring operate to return the lever, substantially as described.

11. In an overhead traveling crane, the combination of a movable carriage or traveling support having an arm or boom suspended therefrom, a power-shaft on the carriage driven continuously in one direction, oppositely-pitched worm-gears on the power-shaft, a clutch-actuated gear-shaft at each end of the carriage driven from the worm-gear at its end of the carriage, an axle at each end of the carriage driven from the clutch-actuated gear-shaft, a lever for the clutch of each clutch-gear, a fluid-pressure cylinder for each lever operating to move the lever and engage and disengage the clutch, an induction and eduction pipe for fluid-pressure to each cylinder, and a valve-chamber for admitting pressure into and discharging pressure from the cylinder-pipe, substantially as described.

12. In an overhead traveling crane, the combination of a movable carriage or traveling support having an arm or boom suspended therefrom, a power-shaft on the carriage driven continuously in one direction, two clutch-actuated bevel-pinions on the power-shaft, a bevel-gear engaged by both bevel-pinions, a shaft driven by the bevel-gear and having a pinion thereon, a gear driven from the pinion and having suspended therefrom the turn-table cylinder or tube shaft carrying the arm or boom, for turning the turn-table-suspending cylinder or tube shaft in opposite directions from the engagement of the bevel-pinions, and fluid-pressure cylinders for engaging and disengaging the clutches of the bevel-pinions, substantially as described.

13. In an overhead traveling crane, the combination of a movable carriage or traveling support having an arm or boom suspended therefrom, a power-shaft on the carriage driven continuously in one direction, two bevel-pinions loosely mounted on the shaft and facing each other, a clutch for each bevel-pinion, a bevel-gear common to both bevel-pinions and driven in opposite directions from the pinions, a gear driven from the bevel-gear and having suspended therefrom the turn-table cylinder or tube shaft carrying the arm or boom, a lever common to both clutches, and fluid-pressure cylinders for moving the lever by fluid-pressure in opposite directions to engage and disengage the clutches and revolve the turn-table-suspending cylinder or tube shaft in opposite directions, substantially as described.

14. In an overhead traveling crane, the combination of a movable carriage or traveling support having an arm or boom suspended therefrom, a power-shaft on the carriage driven continuously in one direction, two bevel-pinions loosely mounted on the power-shaft and facing each other, a clutch for each pinion engaging its pinion with the power-shaft, a lever common to both clutches, a fixed shaft or rod having thereon loose collars between which the end of the lever extends, a coiled spring on the shaft for each loose collar, fluid-pressure cylinders having a common piston-rod with the end of the lever connected thereto for moving the lever by fluid-pressure in opposite directions, and a gear carrying the turn-table-suspending cylinder or tube shaft of the arm or boom and driven in opposite directions from the bevel-pinions, substantially as described.

15. In an overhead traveling crane, the combination of a movable carriage or traveling support having an arm or boom suspended therefrom, a power-shaft on the carriage driven continuously in one direction, two bevel-pinions loosely mounted on the shaft and facing each other, a clutch for each bevel-pinion, a lever common to both clutches, a gear having the turn-table-suspending cylinder or tube shaft for the arm or boom carried thereby, fluid-pressure cylinders having a common piston-rod connected with the clutch-lever for moving the lever by fluid-pressure in opposite directions, a fluid-pressure induction and eduction pipe for each cylinder, and a valve-chamber for each pipe admitting pressure into and discharging pressure from each pipe, substantially as described.

16. In an overhead traveling crane, the combination of a movable carriage or traveling support having an arm or boom suspended therefrom, a power-shaft on the carriage driven continuously in one direction, two bevel-gears loosely mounted on the power-shaft and facing each other, a clutch for each bevel-gear, a bevel-gear common to both of the clutch-gears, and driven in opposite directions by the clutch-gears, an extensible turn-table-suspending cylinder or tube shaft carrying the arm or boom, a screw-threaded tubular shaft within the extensible turn-table-suspending cylinder or tube shaft and carried by the oppositely-driven bevel-gear, and a fluid-pressure cylinder, for engaging and disengaging the clutches of each bevel-gear by fluid-pressure to cause a rotation of the screw-threaded shaft in opposite direction to advance and recede the movable section of the extensible turn-table-suspending cylinder or tube shaft, substantially as described.

17. In an overhead traveling crane, the combination of a movable carriage or traveling support, a power-shaft on the carriage driven continuously in one direction, two bevel-gears loosely mounted on the shaft and facing each other, a clutch for each bevel-gear, a bevel-gear common to both clutch-gears, and driven in opposite directions by the clutch-gears, an extensible turn-table-suspending cylinder or tube shaft carrying an arm or boom, a screw-threaded shaft carried by the oppositely-driven bevel-gear, a lever for each bevel-gear clutch, a fluid-pressure cylinder for each lever engaging and disengaging the clutch from its gear by fluid-pressure, a fixed shaft or rod having thereon a movable collar engaging with the end of the clutch-lever, and a spring on the shaft engaging the movable collar, and operating to return the lever, substantially as described.

18. In an overhead traveling crane, the combination of a movable carriage or traveling support having an arm or boom suspended therefrom, a power-shaft on the carriage driven continuously in one direction, two bevel-gears loosely mounted on the shaft and facing each other, a clutch for each gear, a lever for each clutch, a bevel-gear common to both clutch-gears and driven in opposite directions from the clutch-gears, a screw-threaded shaft carried by the oppositely-driven bevel-gear, an extensible turn-table suspending cylinder or tube shaft having its movable section operated by the rotation of a screw-threaded shaft, a fluid-pressure cylinder for each clutch-lever, an induction and eduction pipe for fluid-pressure for each cylinder, and a valve-chamber for admitting fluid-pressure into and discharging pressure from each pipe to cause the cylinders to engage and disengage their respective clutches, substantially as described.

19. In an overhead traveling crane, the combination of a movable carriage or traveling support having an arm or boom suspended therefrom, a power-shaft on the carriage driven continuously in one direction, two bevel-pinions loosely mounted on the shaft and facing each other, a clutch for each bevel-pinion, a lever common to both clutches, a gear driven in opposite directions from the rotation of the bevel-pinions and having an extensible turn-table-suspended cylinder or tube shaft for the arm or boom carried thereby, fluid-pressure cylinders having a common piston-rod with the clutch-lever attached thereto, for engaging and disengaging the clutches of the two pinions, two bevel-gears loosely mounted on the power-shaft and facing each other, a clutch for each bevel-gear, a lever for each clutch, a bevel-gear common to both clutch-gears and driven in opposite directions from the clutch-gears, a screw-threaded shaft carried by the oppositely-threaded bevel-gear and extending into the fixed section of the suspending turn-table cylinder or tube shaft and operating the extensible section of the suspending cylinder or tube shaft, and a fluid-pressure cylinder for the lever of each bevel-gear clutch to engage and disengage the clutches of the bevel-gears, for the bevel-pinions to act and rotate the suspending shaft or tube bodily and for the bevel-gears to act and move the extension-section of the suspending turn-table cylinder or tube shaft by the engagement and disengagement of the pinions and gears and their clutches, substantially as described.

20. In an overhead traveling crane, the combination of a movable carriage or traveling support having an arm or boom suspended therefrom, a power-shaft on the carriage driven continuously in one direction, two bevel-gears loosely mounted on the shaft and facing each other, a clutch for each bevel-gear, a lever for each clutch, a fluid-pressure cylinder for operating each lever to engage and disengage its clutch, a bevel-gear driven in opposite directions from the clutch-gears, an extensible suspending turn-table cylinder or tube shaft carrying the arm or boom, a screw-threaded shaft carried by the oppositely-driven gear, a fixed gear on the power-shaft, a gear engaged by the fixed gear, and an extensible power-transmitting rod driven from the fixed gears, substantially as described.

21. In an overhead traveling crane, the combination of a carrying head or plate having an annular track thereon, a turn-table gear having an annular track thereon, bearing-balls between the two tracks, and a turn-table-suspending cylinder or tube shaft having a fixed section and an extensible section with the fixed section axially attached to the turn-table gear on the under side thereof and the extensible section vertically slidable in the fixed section and carrying an arm or boom at its lower end, for suspending the arm or boom to be turned or swung into different positions, substantially as described.

22. In an overhead traveling crane, the combination of a head or plate having an annular track thereon, a turn-table gear having an annular track on its under face coinciding with the annular track of the head or plate, ball-bearings between the two tracks, a turn-table-suspending cylinder or tube shaft carried by the gear and having a fixed section and an extensible section, an annular track on the upper face of the turn-table gear, an annular track on the end face of the gear operating the extensible section of the turn-table-suspending cylinder or tube shaft and balls between the two tracks, for supporting both gears on ball-bearings, substantially as described.

23. In an overhead traveling crane, the combination of a turn-table extensible suspending cylinder or tube shaft carried by ball-bearings, a threaded tube and a nut operated by the threaded tube to move the extensible section of the turn-table cylinder or tube shaft and traveling on ball-bearings, substantially as described.

24. In an overhead traveling crane, the combination of a fixed outer cylinder or tube, an extensible turn-table cylinder or tube shaft, a nut on the extensible section of the turn-table cylinder or tube shaft, a hollow shaft having a screw-thread on its exterior engaging with and operating the nut of the extensible section of the turn-table cylinder or tube shaft, means for revolving the turn-table cylinder or tube shaft in both directions and means for revolving the screw-threaded shaft in both directions, substantially as described.

25. In an overhead traveling crane, the combination of an extensible turn-table-suspending cylinder or tube shaft, a hollow shaft having on its exterior a screw-thread for moving the extensible section of the suspending cylinder or tube shaft, and an extensible power-transmitting rod within the hollow shaft for giving the arm or boom a turning movement, and a rising-and-falling movement, and a reciprocating movement, substantially as described.

26. In an overhead traveling crane, the combination of a revoluble hollow shaft, a rotatable extensible power-transmitting rod or shaft located within the hollow shaft, and a guide or bearing between the two sections of the extensible power-transmitting rod or shaft, substantially as described.

27. In an overhead traveling crane, the combination of a fixed outer cylinder or tube, an extensible turn-table-suspending cylinder or tube shaft mounted on ball-bearings, ball-bearings between the outer fixed cylinder or tube and the fixed section of the extensible suspending cylinder or tube shaft at the lower end, a hollow shaft having on its exterior a screw-thread and mounted on ball-bearings, a nut traveling on the screw-thread of the hollow shaft and fixed to the extensible section of the turn-table cylinder or tube shaft, an extensible power-transmitting rod or shaft in the hollow screw-threaded shaft, means for revolving the turn-table cylinder or tube shaft in opposite directions, means for revolving the hollow screw-threaded shaft in opposite directions, and means for revolving the power-transmitting rod or shaft, for the revolutions to turn or swing, raise and lower and reciprocate an arm or boom, substantially as described.

28. In an overhead traveling crane, the combination of an extensible turn-table-suspending cylinder or tube shaft, a head or support on the lower end of the extensible section of the turn-table cylinder or tube shaft, an arm or boom having side sills or rails carried between rollers on the head or support, and means for reciprocating the arm or boom by traveling the side sills or pieces between the rollers, substantially as described.

29. In an overhead traveling crane, the combination of a suspended head or support, an arm or boom having side rails or sills mounted between rollers on the head or support, a shaft having an exterior screw-thread and mounted on the arm or boom and the head or support, and means for traveling the shaft in opposite directions and giving a reciprocating movement to the arm or boom, substantially as described.

30. In an overhead traveling crane, the combination of a suspended head or support, an arm or boom having side rails or sills mounted between rollers on the head or support, a shaft having a screw-thread on its exterior and mounted in bearings on the arm or boom and on the head or support, a nut or sleeve having a screw-thread engaging the screw-thread of the shaft, two pinions loosely mounted on the nut or sleeve and facing each other, a clutch for each pinion, a rotatable gear common to both pinions, and means for engaging and disengaging the clutches from the pinions to give opposite directions of rotation to the nut or sleeve and reciprocate the arm or boom, substantially as described.

31. In an overhead traveling crane, the combination of an extensible turn-table cylinder or tube shaft, means for revolving the turn-table cylinder or tube shaft, in opposite directions, means for raising and lowering the extensible section of the turn-table cylinder or tube shaft, a head or support on the lower end of the extensible section of the turn-table cylinder or tube, an arm or boom having side sills or rails mounted between rollers on the head or support, a shaft having an exterior screw-thread mounted in bearings on the arm or boom and the head or support, a nut or sleeve having a screw-thread engaging the screw-thread of the shaft, two pinions loosely mounted on the nut or sleeve and facing each other, a clutch for each pinion, means for engaging and disengaging the clutches, a driving-gear common to both pinions, and a power-transmitting rod or shaft rotating the driving-gear continuously in one direction, for giving the arm or boom a turning or swinging movement, a rising-and-falling movement, and a reciprocating movement, substantially as described.

32. In an overhead traveling crane, the combination of a suspended arm or boom, means for horizontally reciprocating the arm or boom, independently of its travel and a pick-up or lifter at one end of the arm or boom adapted to be entered beneath the article to be carried by the arm or boom, substantially as described.

33. In an overhead traveling crane, the combination of a suspended arm or boom, means for horizontally reciprocating the arm or boom independently of its travel, a pick-up or lifter carried at one end of the arm or boom and having a limited drop, and means for suspending the pick-up or lifter to permit the limited drop, substantially as described.

34. In an overhead traveling crane, the combination of a suspended arm or boom, means for reciprocating the arm or boom, a pick-up or lifter at one end of the arm or boom having side fingers, a slide for each finger, a guide for each slide on the end of the arm or boom, cross-shafts and links connecting the pick-up or lifter with the arm or boom through the slides and guides, and a dog or catch for holding the pick-up or lifter in position, substantially as described.

35. In an overhead traveling crane, the combination of a suspended arm or boom, means for reciprocating the arm or boom, a pick-up or lifter at one end of the arm or boom, suspending links carrying the pick-up or lifter and permitting a limited downward movement thereof, and a catch or latch retaining the pick-up or lifter in its raised and dropped positions, substantially as described.

36. In an overhead traveling crane, the combination of a suspended arm or boom, means for reciprocating the arm or boom, a pick-up or lifter at one end of the arm or boom, suspending links carrying the pick-up or lifter and permitting a limited downward movement thereof, a catch or latch retaining the pick-up or lifter in its raised and dropped position, a release arm or lever, and a cord for operating the release arm or lever to disengage the catch or latch, substantially as described.

37. In an overhead traveling crane, the combination of a suspended arm or boom, a pick-up or lifter at one end of the arm or boom having a limited rising-and-falling movement, links carrying the pick-up or lifter from the arm or boom, a latch or catch retaining the pick-up or lifter in its raised and dropped positions, a release-arm for the latch or catch, a cord for the release-arm, rollers between which the release-arm cord runs, and a lever for moving one of the rollers to operate the cord, and disengage the latch or catch of the pick-up or lifter, substantially as described.

38. In an overhead traveling crane, the combination of a suspended arm or boom having a reciprocating movement, a pick-up or lifter at one end of the arm or boom, a rack on the arm or boom, a dog engaging the rack, and a lever for operating the rack for furnishing a resistance to assist in forcing the pick-up or lifter beneath the article to be carried by the arm or boom, substantially as described.

39. In an overhead traveling crane, the combination of a traveling frame mounted on a main track and traveling back and forth thereon, a movable carriage or traveling support mounted and traveling back and forth on the frame and having suspended therefrom an arm or boom, a power-motor on the carriage, a power-shaft on the carriage driven from the motor continuously in one direction, driving-pulleys loosely mounted on the power-shaft, one pulley driving a straight belt and the other a crossed belt for moving the frame in opposite directions, a clutch for each pulley, fluid-pressure cylinders for operating the clutches of the pulleys, oppositely-pitched worm-gears on the power-shaft for moving the carriage in opposite directions, a shaft and gear at each end of the carriage operated from the worm-gear, a clutch for each shaft-gear, a fluid-pressure cylinder for operating each clutch, bevel-pinions loosely mounted on the power-shaft and facing each other for rotating the extensible turn-table cylinder or tube shaft carrying the arm or boom, a clutch for each pinion, fluid-pressure cylinders for moving the clutches, bevel gear-wheels loosely mounted on the power-shaft facing each other for raising and lowering the extensible section of the turn-table cylinder or tube shaft, a clutch for each bevel-gear, fluid-pressure cylinders for moving the clutches, induction and eduction pipes for the several fluid-pressure cylinders, and a valve-chamber for each pipe for operating the several parts by fluid-pressure, substantially as described.

40. In an overhead traveling crane, having a main frame movable in both directions on a track and a carriage or traveling support movable in both directions on the main frame and having suspended therefrom an arm or boom, the combination of fluid-pressure cylinders for operating clutches to engage and disengage the power and give the arm or boom a turning or swinging movement and a rising-and-falling movement and to travel the main frame and the carriage or traveling support, a fluid-pressure reservoir for compressed air, induction and eduction pipes between the fluid-pressure reservoir and the cylinders, and valve-chambers for controlling the admission and discharge of fluid-pressure to and from the cylinders for engaging and disengaging the clutches, substantially as described.

41. In an overhead traveling crane, having a main frame movable in both directions on a track and a carriage or traveling support movable in both directions on the main frame and having suspended therefrom an arm or boom, the combination of fluid-pressure cylinders for operating the clutches to engage and disengage the power in the arm or boom a turning or swinging movement and a rising-and-falling movement and to travel the main frame and the carriage or traveling support, and a fixed rod or shaft having the fluid-pressure cylinders adjustably mounted thereon, substantially as described.

42. In an overhead traveling crane, having a main frame movable in both directions on a track and a carriage or traveling support movable in both directions on the main frame and having suspended therefrom an arm or boom, the combination of a main power-shaft on the carriage or traveling support having a continuous rotation in one direction, clutch connections for the power-shaft to engage and disengage the power and give the arm or boom a turning or swinging movement and a rising-and-falling movement and to travel the main frame and the carriage or traveling support, levers for operating the clutches, fixed rods or shafts for guiding the levers and fluid-pressure cylinders adjustable on their fixed rods or shafts for moving the clutch-levers to engage and disengage the clutches, substantially as described.

43. In an overhead traveling crane, having a main frame movable in both directions on a track and a carriage or traveling support movable in both directions on the main frame and having suspended therefrom an arm or boom, the combination of a counter-shaft transmitting power to travel the frame and longitudinally of which the carriage or traveling support moves and a drop bearing or support for the counter-shaft to be moved out of the way to permit the carriage or traveling support to pass and return to operative position after the passage of the carriage or traveling support, substantially as described.

44. In an overhead traveling crane, having a main frame movable in both directions on a track and a carriage or traveling support movable in both directions on the main frame and having suspended therefrom an arm or boom, the combination of a counter-shaft transmitting power to travel the main frame and longitudinally of which the carriage or traveling support moves, a hanger having a shoe depending from the carriage or traveling support and slidable on the counter-shaft, a drop bearing or support for the counter-shaft engaged by the shoe of the hanger and moved out of the way for the passage of the hanger, links having the drop bearing or support pivotally mounted therein, and rock-shafts mounted on the main frame and having the links connected therewith, substantially as described.

45. In an overhead traveling crane, having a main frame movable in both directions on a track and a carriage or traveling support movable in both directions on the main frame and having suspended therefrom an arm or boom, the combination of a counter-shaft transmitting power to travel the main frame and longitudinally of which the carriage or traveling support moves, a hanger having a shoe depending from the carriage or traveling support and slidable on the counter-shaft, a drop bearing or support for the counter-shaft engaged by the shoe of the hanger and moved out of the way for the passage of the hanger, links having the drop bearing or support pivotally mounted therein, rock-shafts mounted on the main frame and having the links connected therewith, an arm or lever connected with one rock-shaft and a return-spring for the arm or lever, substantially as described.

46. In an overhead traveling crane, the combination of a carriage or traveling support having suspended therefrom an arm or boom provided with means for the arm or boom to have a swinging or turning movement and a rising-and-falling movement, a main power-shaft on the carriage or traveling support having a continuous rotation in the same direction, friction-clutch connections actuated by fluid-pressure for engaging and disengaging the power in operating the arm or boom, substantially as described.

47. In an overhead traveling crane, the combination of a carriage or traveling support having suspended therefrom an arm or boom, provided with means for the arm or boom to have a turning or swinging movement and a rising-and-falling movement, friction-clutches to engage and disengage the power and give the arm or boom the turning or swinging movement and the rising-and-falling movement, levers for operating the clutches, fluid-pressure cylinders having piston-rods to move the levers and operate the clutches, substantially as described.

48. In an overhead traveling crane having a lengthwise-reciprocating movement and a crosswise-reciprocating movement, the combination of a suspended head or support having a rising and a falling movement and a swinging or turning movement given thereto, and having mounted thereon the controlling means of the operating mechanisms for giving the crane as a whole its various movements, substantially as described.

49. In an overhead traveling crane having a lengthwise-reciprocating and crosswise-reciprocating movement, the combination of a suspended head or support, having a rising and a falling movement and a swinging or turning movement given thereto, an arm or boom suspended from the head or support and having the movements of the head or support and an additional horizontal reciprocating movement given thereto, and means mounted on the head or support for controlling the operating mechanisms by which the crane as a whole and the arm or boom are given their various movements, substantially as described.

GEORGE W. PACKER.

Witnesses:
ARTHUR JOHNSON,
CARL DETZN.